(12) United States Patent
Poth et al.

(10) Patent No.: US 8,359,218 B2
(45) Date of Patent: Jan. 22, 2013

(54) COMPUTER READABLE MEDIUM FOR IMPLEMENTING SUPPLY CHAIN CONTROL USING SERVICE-ORIENTED METHODOLOGY

(75) Inventors: Andreas Poth, Weingarten (DE); Stephan Hetzer, Oestringen-Eichelberg (DE); Achim Clemens, Speyer (DE); Bernhard Lokowandt, Heidelberg (DE); Alexander S. Adam, Montreal (CA); Christian Baeck, Wiesloch (DE); Martin J. Wilmes, Oftersheim (DE); Sabine Deimel, Rauenberg (DE); Renzo Colle, Stutensee (DE); Andreas Bettin, Bad Schoenborn (DE); Sascha Weber, Ranstadt (DE); Hao Zheng, Walldorf (DE); Thomas Kretz, Muehlhausen (DE); Volker Schott, Nussloch (DE); Anton Ruskov Kaharkov, Heidelberg (DE); Jochen Steinbach, Bad Schoenborn (DE); Thomas Gross-Boelting, Walldorf (DE); Rainer Tomski, Wuerselen (DE); Sanjeev Mehta, Bangalore (IN); Jens Freund, Heidelberg (DE); Frank Wagner, Neckarsteinach-Necharhausen (DE)

(73) Assignee: SAP AG, Walldorf (DE)

( * ) Notice: Subject to any disclaimer, the term of this patent is extended or adjusted under 35 U.S.C. 154(b) by 502 days.

(21) Appl. No.: 12/233,550

(22) Filed: Sep. 18, 2008

(65) Prior Publication Data

US 2010/0070337 A1   Mar. 18, 2010

(51) Int. Cl.
*G06Q 10/00* (2006.01)
*G06Q 30/00* (2006.01)

(52) U.S. Cl. ............ 705/7.12; 705/7.13; 705/7.25; 705/26.2; 705/26.81; 705/28; 705/330; 705/336

(58) Field of Classification Search ........ 705/7.11–7.42, 705/26.2, 26.81, 28, 330, 336
See application file for complete search history.

(56) References Cited

U.S. PATENT DOCUMENTS

| | | |
|---|---|---|
| 5,586,312 A | 12/1996 | Johnson et al. |
| 5,710,917 A | 1/1998 | Musa et al. |
| 5,898,872 A | 4/1999 | Richley |
| 5,991,536 A | 11/1999 | Brodsky et al. |
| 6,038,393 A | 3/2000 | Iyengar et al. |
| 6,049,838 A | 4/2000 | Miller et al. |
| 6,112,024 A | 8/2000 | Almond et al. |
| 6,167,563 A | 12/2000 | Fontana et al. |
| 6,182,133 B1 | 1/2001 | Horvitz |
| 6,208,345 B1 | 3/2001 | Sheard et al. |
| 6,237,136 B1 | 5/2001 | Sadahiro |
| 6,446,045 B1 | 9/2002 | Stone et al. |
| 6,601,234 B1 | 7/2003 | Bowman-Amuah |
| 6,606,744 B1 | 8/2003 | Mikurak |
| 6,671,673 B1 | 12/2003 | Baseman et al. |

(Continued)

OTHER PUBLICATIONS

Papazoglou et al. "Service-Oriented Computing Research Road Map" (Mar. 1, 2006) http://infolab.uvt.nl/pub/papazogloump-2006-96.pdf.*

(Continued)

*Primary Examiner* — Lynda C Jasmin
*Assistant Examiner* — Sujay Koneru
(74) *Attorney, Agent, or Firm* — Fish & Richardson P.C.

(57) ABSTRACT

Methods and apparatus, including systems and computer program products, for a services architecture design that provides enterprise services having supply chain control functionality at the level of an enterprise application. The design includes a set of service operations, process components, and optionally deployment units. Suitable business objects are also described.

15 Claims, 11 Drawing Sheets

U.S. PATENT DOCUMENTS

| | | |
|---|---|---|
| 6,687,734 B1 | 2/2004 | Sellink et al. |
| 6,691,151 B1 | 2/2004 | Cheyer et al. |
| 6,747,679 B1 | 6/2004 | Finch et al. |
| 6,750,885 B1 | 6/2004 | Finch et al. |
| 6,764,009 B2 | 7/2004 | Melick et al. |
| 6,772,216 B1 | 8/2004 | Ankireddipally et al. |
| 6,845,499 B2 | 1/2005 | Srivastava et al. |
| 6,859,931 B1 | 2/2005 | Cheyer et al. |
| 6,889,197 B2 | 5/2005 | Lidow |
| 6,895,438 B1 | 5/2005 | Ulrich |
| 6,898,783 B1 | 5/2005 | Gupta et al. |
| 6,904,399 B2 | 6/2005 | Cooper et al. |
| 6,907,395 B1 | 6/2005 | Hunt et al. |
| 6,954,736 B2 | 10/2005 | Menninger et al. |
| 7,003,474 B2 | 2/2006 | Lidow |
| 7,031,998 B2 | 4/2006 | Archbold |
| 7,103,873 B2 | 9/2006 | Tanner et al. |
| 7,120,896 B2 | 10/2006 | Budhiraja et al. |
| 7,155,403 B2 | 12/2006 | Cirulli et al. |
| 7,184,964 B2 | 2/2007 | Wang |
| 7,213,232 B1 | 5/2007 | Knowles |
| 7,225,240 B1 | 5/2007 | Fox et al. |
| 7,249,044 B2 | 7/2007 | Kumar et al. |
| 7,293,254 B2 | 11/2007 | Bloesch et al. |
| 7,322,024 B2 | 1/2008 | Carlson et al. |
| 7,324,966 B2 | 1/2008 | Scheer |
| 7,353,180 B1 * | 4/2008 | Silverstone et al. ......... 705/7.11 |
| 7,356,492 B2 | 4/2008 | Hazi et al. |
| 7,370,315 B1 | 5/2008 | Lovell et al. |
| 7,376,601 B1 | 5/2008 | Aldridge |
| 7,376,604 B1 | 5/2008 | Butcher |
| 7,376,632 B1 | 5/2008 | Sadek et al. |
| 7,383,201 B2 * | 6/2008 | Matsuzaki et al. ........... 705/7.25 |
| 7,415,697 B1 | 8/2008 | Houlding |
| 7,424,701 B2 | 9/2008 | Kendall et al. |
| 7,460,654 B1 | 12/2008 | Jenkins et al. |
| 7,516,088 B2 | 4/2009 | Johnson et al. |
| 7,529,699 B2 | 5/2009 | Fuse et al. |
| 7,536,325 B2 | 5/2009 | Randell et al. |
| 7,546,520 B2 | 6/2009 | Davidson et al. |
| 7,546,575 B1 | 6/2009 | Dillman et al. |
| 7,574,694 B2 | 8/2009 | Mangan et al. |
| 7,624,371 B2 | 11/2009 | Kulkarni et al. |
| 7,640,291 B2 | 12/2009 | Maturana et al. |
| 7,644,390 B2 | 1/2010 | Khodabandehloo et al. |
| 7,657,406 B2 | 2/2010 | Tolone et al. |
| 7,657,445 B1 | 2/2010 | Goux |
| 7,668,761 B2 | 2/2010 | Jenkins et al. |
| 7,672,888 B2 | 3/2010 | Allin et al. |
| 7,681,176 B2 | 3/2010 | Wills et al. |
| 7,693,586 B2 | 4/2010 | Dumas et al. |
| 7,703,073 B2 | 4/2010 | Illowsky et al. |
| 7,739,160 B1 | 6/2010 | Ryan et al. |
| 7,742,985 B1 | 6/2010 | Digrigoli et al. |
| 7,747,980 B2 | 6/2010 | Illowsky et al. |
| 7,765,156 B2 | 7/2010 | Staniar et al. |
| 7,765,521 B2 | 7/2010 | Bryant |
| 7,788,145 B2 | 8/2010 | Wadawadigi et al. |
| 7,788,319 B2 | 8/2010 | Schmidt |
| 7,793,256 B2 | 9/2010 | Charisius et al. |
| 7,793,258 B2 | 9/2010 | Sundararajan et al. |
| 7,797,698 B2 | 9/2010 | Diament et al. |
| 7,814,142 B2 * | 10/2010 | Mamou et al. ................ 709/203 |
| 7,822,682 B2 | 10/2010 | Arnold et al. |
| 7,835,971 B2 | 11/2010 | Stockton et al. |
| 7,886,041 B2 | 2/2011 | Outhred et al. |
| 7,895,568 B1 | 2/2011 | Goodwin et al. |
| 7,904,350 B2 * | 3/2011 | Ayala et al. ...................... 705/28 |
| 7,912,755 B2 | 3/2011 | Perry et al. |
| 7,917,889 B2 | 3/2011 | Devarakonda et al. |
| 7,925,985 B2 | 4/2011 | Moore |
| 8,001,519 B2 | 8/2011 | Conallen et al. |
| 8,010,938 B2 | 8/2011 | Elaasar |
| 8,091,065 B2 | 1/2012 | Mir et al. |
| 8,112,738 B2 | 2/2012 | Pohl et al. |
| 2001/0052108 A1 | 12/2001 | Bowman-Amuah |
| 2002/0026394 A1 | 2/2002 | Savage et al. |
| 2002/0042756 A1 | 4/2002 | Kumar et al. |
| 2002/0049622 A1 * | 4/2002 | Lettich et al. ...................... 705/7 |
| 2002/0073114 A1 | 6/2002 | Nicastro et al. |
| 2002/0078046 A1 | 6/2002 | Uluakar et al. |
| 2002/0082892 A1 | 6/2002 | Raffel et al. |
| 2002/0103660 A1 | 8/2002 | Cramon et al. |
| 2002/0104071 A1 | 8/2002 | Charisius et al. |
| 2002/0107826 A1 | 8/2002 | Ramachandran et al. |
| 2002/0120553 A1 | 8/2002 | Bowman-Amuah |
| 2002/0133368 A1 | 9/2002 | Strutt et al. |
| 2002/0138281 A1 | 9/2002 | Cirulli et al. |
| 2002/0138358 A1 | 9/2002 | Scheer |
| 2002/0143598 A1 * | 10/2002 | Scheer ............................. 705/9 |
| 2002/0156695 A1 | 10/2002 | Edwards |
| 2002/0161907 A1 | 10/2002 | Moon |
| 2002/0184111 A1 | 12/2002 | Swanson |
| 2002/0188486 A1 * | 12/2002 | Gil et al. .......................... 705/7 |
| 2002/0198798 A1 | 12/2002 | Ludwig et al. |
| 2002/0198828 A1 | 12/2002 | Ludwig et al. |
| 2003/0009754 A1 | 1/2003 | Rowley et al. |
| 2003/0069774 A1 | 4/2003 | Hoffman et al. |
| 2003/0074271 A1 | 4/2003 | Viswanath et al. |
| 2003/0074360 A1 | 4/2003 | Chen et al. |
| 2003/0083762 A1 | 5/2003 | Farrah et al. |
| 2003/0084127 A1 | 5/2003 | Budhiraja et al. |
| 2003/0130860 A1 | 7/2003 | Datta et al. |
| 2003/0182206 A1 | 9/2003 | Hendrix et al. |
| 2003/0212602 A1 | 11/2003 | Schaller |
| 2003/0233290 A1 * | 12/2003 | Yang et al. ...................... 705/28 |
| 2004/0015367 A1 | 1/2004 | Nicastro et al. |
| 2004/0034578 A1 | 2/2004 | Oney et al. |
| 2004/0093268 A1 | 5/2004 | Ramchandani et al. |
| 2004/0111304 A1 * | 6/2004 | Meka et al. ........................ 705/7 |
| 2004/0111639 A1 | 6/2004 | Schwartz et al. |
| 2004/0128180 A1 | 7/2004 | Abel et al. |
| 2004/0133481 A1 | 7/2004 | Schwarze et al. |
| 2004/0153359 A1 * | 8/2004 | Ho et al. ......................... 705/10 |
| 2004/0158506 A1 | 8/2004 | Wille |
| 2004/0172510 A1 | 9/2004 | Nagashima et al. |
| 2004/0181470 A1 | 9/2004 | Grounds |
| 2004/0181538 A1 | 9/2004 | Lo et al. |
| 2004/0205011 A1 | 10/2004 | Northington et al. |
| 2004/0236639 A1 | 11/2004 | Candadai et al. |
| 2004/0236687 A1 | 11/2004 | Tyson-Quah |
| 2004/0243489 A1 | 12/2004 | Mitchell et al. |
| 2004/0254866 A1 | 12/2004 | Crumbach et al. |
| 2004/0255152 A1 | 12/2004 | Kanamori et al. |
| 2005/0010501 A1 | 1/2005 | Ward |
| 2005/0033588 A1 | 2/2005 | Ruiz et al. |
| 2005/0044015 A1 | 2/2005 | Bracken et al. |
| 2005/0060235 A2 | 3/2005 | Byrne |
| 2005/0060408 A1 | 3/2005 | McIntyre et al. |
| 2005/0065828 A1 | 3/2005 | Kroswek et al. |
| 2005/0108680 A1 | 5/2005 | Cheng et al. |
| 2005/0113092 A1 | 5/2005 | Coppinger et al. |
| 2005/0114829 A1 | 5/2005 | Robin et al. |
| 2005/0125310 A1 | 6/2005 | Hazi et al. |
| 2005/0144125 A1 | 6/2005 | Erbey et al. |
| 2005/0144226 A1 | 6/2005 | Purewal |
| 2005/0156500 A1 | 7/2005 | Birecki et al. |
| 2005/0160104 A1 | 7/2005 | Meera et al. |
| 2005/0165784 A1 | 7/2005 | Gomez et al. |
| 2005/0177435 A1 | 8/2005 | Lidow |
| 2005/0203760 A1 | 9/2005 | Gottumukkala et al. |
| 2005/0203813 A1 | 9/2005 | Welter et al. |
| 2005/0209732 A1 * | 9/2005 | Audimoolam et al. ........ 700/216 |
| 2005/0209943 A1 | 9/2005 | Ballow et al. |
| 2005/0216325 A1 | 9/2005 | Ziad et al. |
| 2005/0222896 A1 | 10/2005 | Rhyne et al. |
| 2005/0235020 A1 | 10/2005 | Gabelmann et al. |
| 2005/0240592 A1 * | 10/2005 | Mamou et al. ..................... 707/9 |
| 2005/0246250 A1 | 11/2005 | Murray |
| 2005/0246482 A1 | 11/2005 | Gabelmann et al. |
| 2005/0256775 A1 | 11/2005 | Schapler et al. |
| 2005/0256882 A1 | 11/2005 | Able et al. |
| 2005/0257125 A1 | 11/2005 | Roesner et al. |
| 2005/0257197 A1 | 11/2005 | Herter et al. |
| 2005/0262192 A1 | 11/2005 | Mamou et al. |
| 2005/0284934 A1 | 12/2005 | Ernesti et al. |
| 2005/0288987 A1 | 12/2005 | Sattler et al. |

| | | |
|---|---|---|
| 2005/0289020 A1 | 12/2005 | Bruns et al. |
| 2005/0289079 A1 | 12/2005 | Krishan et al. |
| 2006/0004802 A1 | 1/2006 | Phillips et al. |
| 2006/0053063 A1 | 3/2006 | Nagar |
| 2006/0064344 A1* | 3/2006 | Lidow .............................. 705/10 |
| 2006/0074704 A1 | 4/2006 | Shukla et al. |
| 2006/0085294 A1 | 4/2006 | Boerner et al. |
| 2006/0089886 A1 | 4/2006 | Wong |
| 2006/0095439 A1 | 5/2006 | Buchmann et al. |
| 2006/0129978 A1 | 6/2006 | Abrari et al. |
| 2006/0143029 A1 | 6/2006 | Akbay et al. |
| 2006/0206352 A1* | 9/2006 | Pulianda ............................ 705/1 |
| 2006/0248504 A1 | 11/2006 | Hughes |
| 2007/0011650 A1 | 1/2007 | Hage et al. |
| 2007/0075916 A1 | 4/2007 | Bump et al. |
| 2007/0094261 A1 | 4/2007 | Phelan et al. |
| 2007/0143164 A1 | 6/2007 | Kaila et al. |
| 2007/0150332 A1* | 6/2007 | Grichnik et al. ................ 705/10 |
| 2007/0150855 A1 | 6/2007 | Jeong |
| 2007/0156474 A1 | 7/2007 | Scherberger et al. |
| 2007/0156475 A1* | 7/2007 | Berger et al. ..................... 705/7 |
| 2007/0156493 A1 | 7/2007 | Tebbe et al. |
| 2007/0156500 A1 | 7/2007 | Merkel et al. |
| 2007/0156538 A1 | 7/2007 | Peter et al. |
| 2007/0156550 A1 | 7/2007 | Der Emde et al. |
| 2007/0174145 A1* | 7/2007 | Hetzer et al. ..................... 705/28 |
| 2007/0197877 A1 | 8/2007 | Decorte et al. |
| 2007/0220143 A1 | 9/2007 | Lund et al. |
| 2007/0233539 A1 | 10/2007 | Suenderhauf et al. |
| 2007/0233541 A1 | 10/2007 | Schorr et al. |
| 2007/0233574 A1 | 10/2007 | Koegler et al. |
| 2007/0233575 A1 | 10/2007 | Berger et al. |
| 2007/0233598 A1 | 10/2007 | Der Emde et al. |
| 2007/0265862 A1 | 11/2007 | Freund et al. |
| 2008/0017722 A1 | 1/2008 | Snyder et al. |
| 2008/0065437 A1* | 3/2008 | Dybvig ............................. 705/7 |
| 2008/0162382 A1* | 7/2008 | Clayton et al. ................ 705/500 |
| 2009/0063112 A1 | 3/2009 | Hader et al. |
| 2009/0171716 A1 | 7/2009 | Suenderhauf et al. |
| 2009/0171818 A1 | 7/2009 | Penning et al. |
| 2009/0172699 A1 | 7/2009 | Jungkind et al. |
| 2009/0189743 A1 | 7/2009 | Abraham et al. |
| 2009/0192858 A1* | 7/2009 | Johnson ............................ 705/8 |
| 2010/0070324 A1 | 3/2010 | Bock et al. |
| 2010/0070331 A1 | 3/2010 | Koegler et al. |
| 2010/0070336 A1 | 3/2010 | Koegler et al. |
| 2010/0070395 A1 | 3/2010 | Elkeles et al. |
| 2010/0070555 A1 | 3/2010 | Duparc et al. |
| 2010/0100464 A1 | 4/2010 | Ellis et al. |
| 2010/0138269 A1 | 6/2010 | Cirpus et al. |
| 2011/0252395 A1 | 10/2011 | Charisius et al. |

OTHER PUBLICATIONS

Gould, "Integrating the Manufacturing Enterprise" (Jan 2007), Automative Design & Production, 119, 1; ABI/INFORM Global, p. 46.*

Orsburn "Spares Management Handbook" (1991) McGrawHill, ISBN: 0-8306-7626-0.*

Cohen "Optimizer: IBM's Multi-Echelon Inventory System for Managing Service Logistics Interfaces" (1990) Vo. 20, No. 1, pp. 65-82.*

Cohen et al. "Saturn's Supply-Chain Innovation: High Value in After Sales Service" (2000) Sloan Management Review, vol. 41, No. 4, pp. 93-101.*

Kalakota et al. "Readings in Electronic Commerce" (1995) Addison-Wesley Longman, Inc. ISBN: 0-201-88060-1.*

Stephens "Supply Chain Operations Reference Model Version 5.0: A New Tool to Improve Supply Chain Efficiency and Achieve Best Practice" (2001) Information Systems Frontiers, 3;4, 471-476.*

Huang et al. "Supply chain configuration based on supply chain operations reference (SCOR) model" (2005) Computers and Industrial Engineering, Elsevier.*

Cascallar, Eduardo et al.; "Assessment in the Evaluation of Self-Regulation as a Process"; Educational Psychology Review; vol. 18, No. 3; Sep. 2006; pp. 297-306.

Cool, David W.; "Activity Fund Accounting"; School Business Affairs; vol. 49, No. 6; Jun. 1983; pp. 50-52.

Ferscha et al.; "A Light-Weight Component Model for Peer-to-Peer Applications"; IEEE; Mar. 23, 2004.

Flissi et al.; "A Component-based Software Infrastructure for Ubiquitous Computing"; IEEE; Jul. 4, 2005.

SAP AG; "SAP NetWeaver Visual Composer: User Guide (SAP NetWeaver Visual Composer release 6.0)"; Document version 1.1; pp. 1-208.

SAP AG; "Powered by SAP NetWeaver Partner Program—Frequently Asked Questions"; May 2005; 10 pages [online] http://www.lionbridge.com/NR/rdonlyres/4940BE1F/DA46/412E/AB16/F049BD865CA1/0/PBMWFAQ_50070686_en.pdf.

Strelich, Thomas P. et al.; "Simulation-Based Transformation with the Service Integration/Interoperation Infrastructure"; Technology Review Journal; Fall/Winter 2005; pp. 99-115.

Office Action issued in U.S. Appl. No. 11/396,312 on Sep. 10, 2010; 23 pages.

Office Action issued in U.S. Appl. No. 11/322,611 on Sep. 16, 2010; 21 pages.

Notice of Allowance issued in U.S. Appl. No. 11/322,610 on Sep. 23, 2010; 6 pages.

Notice of Allowance issued in U.S. Appl. No. 11/322,610 on Dec. 22, 2010; 6 pages.

Notice of Allowance issued in U.S. Appl. No. 11/322,398 on Oct. 29, 2010; 18 pages.

Notice of Allowanced issued in U.S. Appl. No. 11/322,398 on Nov. 15, 2010; 20 pages.

Notice of Allowance issued in U.S. Appl. No. 11/322,610 on Mar. 31, 2011; 6 pages.

Notice of Allowance issued in U.S. Appl. No. 1/322,382 on Sep. 20, 2010; 6 pages.

Notice of Allowance issued in U.S. Appl. No. 1/322,382 on Jan. 6, 2011; 7 pages.

Notice of Allowance issued in U.S. Appl. No. 11/396,259 on Oct. 15, 2010; 6 pages.

Notice of Allowance issued in U.S. Appl. No. 11/396,259 on Jan. 20, 2011; 6 pages.

Notice of Allowance issued in U.S. Appl. No. 11/396,288; Dec. 28, 2010; 4 pages.

Notice of Allowance issued in U.S. Appl. No. 11/396,288; Sep. 24, 2010; 4 pages.

Office Action issued in U.S. Appl. No. 11/396,250 on Oct. 18, 2010; 15 pages.

Notice of Allowance issued in U.S. Appl. No. 11/396,250 on Mar. 2, 2011; 13 pages.

Notice of Allowance issued in U.S. Appl. No. 11/396,258 on Jul. 28, 2010; 9 pages.

Notice of Allowance issued in U.S. Appl. No. 11/396,258 on Nov. 16, 2010; 8 pages.

Office Action issued in U.S. Appl. No. 11/396,236 on Oct. 28, 2010; 19 pages.

Notice of Allowance issued in U.S. Appl. No. 11/322,845; Dec. 27, 2010; 16 pages.

Office Action issued in U.S. Appl. No. 11/323,040 on Nov. 5, 2010; 33 pages.

Notice of Allowance issued in U.S. Appl. No. 11/397,026 on Nov. 15, 2010; 7 pages.

Notice of Allowance issued in U.S. Appl. No. 11/397,026 on Mar. 3, 2011; 6 pages.

Notice of Allowance issued in U.S. Appl. No. 12/233,554 on Sep. 17, 2010; 10 pages.

Notice of Allowance issued in U.S. Appl. No. 12/233,554 on Feb. 22, 2011; 7 pages.

Notice of Allowance issued in U.S. Appl. No. 11/968,054 on Sep. 7, 2010; 11 pages.

Office Action issued in U.S. Appl. No. 12/233,557 on Sep. 16, 2010; 16 pages.

Office Action issued in U.S. Appl. No. 12/233,557 on Mar. 4, 2011; 19 pages.

Notice of Allowance issued in U.S. Appl. No. 12/233,534 on Oct. 20, 2010; 15 pages.

Notice of Allowance issued in U.S. Appl. No. 12/233,534 on Jan. 31, 2011; 15 pages.

Notice of Allowance issued in U.S. Appl. No. 12/327,354 on Oct. 18, 2010; 16 pages.
Notice of Allowance issued in U.S. Appl. No. 12/327,354 on Feb. 1, 2011; 16 pages.
Notice of Allowance issued in U.S. Appl. No. 11/967,865 on Oct. 6, 2010; 6 pages.
Office Action issued in U.S. Appl. No. 11/322,973 on Dec. 7, 2010; 13 pages.
Notice of Allowance issued in U.S. Appl. No. 11/396,327 on Nov. 30, 2010; 28 pages.
Office Action issued in U.S. Appl. No. 11/404,147 on Nov. 24, 2010; 27 pages.
Notice of Allowance issued in U.S. Appl. No. 12/233,462 on Feb. 2, 2011; 11 pages.
Office Action issued in U.S. Appl. No. 11/967,483; Aug. 20, 2010; 10 pages.
Office Action issued in U.S. Appl. No. 11/967, 483 on Mar. 4, 2011; 6 pages.
Notice of Allowance issued in U.S. Appl. No. 12/333,085; Sep. 13, 2010; 8 pages.
Bin et al.; "Component Model Optimization for Distributed Real-Time Embedded Software"; IEEE International Conference on Systems, Man and Cybernetics; Oct. 13, 2004; 6 pages.
Cox et al.; "A Formal Model for Component Based Software"; IEEE; Aug. 7, 2002; 8 pages.
Notice of Allowance issued in U.S. Appl. No. 12/233,554 on Jun. 27, 2011; 7 pages.
Office Action issued in U.S. Appl. No. 11/323,634 on Apr. 29, 2011; 8 pages.
Office Action issued in U.S. Appl. No. 11/322,973 on May 27, 2011; 15 pages.
Notice of Allowance issued in U.S. Appl. No. 12/233,462 on May 18, 2011; 6 pages.
Office Action issued in U.S. Appl. No. 12/233,457 on May 26, 2011; 19 pages.
Office Action issued in U.S. Appl. No. 12/327,232 on May 26, 2011; 20 pages.
Office Action issued in U.S. Appl. No. 12/327,590 on Jun. 23, 2011; 16 pages.
Notice of Allowance issued in U.S. Appl. No. 12/233,534 on May 16, 2011; 12 pages.
Notice of Allowanced issued in U.S. Appl. No. 11/322,398 on May 27, 2011; 21 pages.
Notice of Allowance issued in U.S. Appl. No. 11/396,250 on Jun. 24, 2011; 5 pages.
Notice of Allowance issued in U.S. Appl. No. 11/396,258 on Jun. 28, 2011; 9 pages.
Notice of Allowance issued in U.S. Appl. No. 11/322,845; Apr. 8, 2011; 8 pages.
Office Action issued in U.S. Appl. No. 12/233,417 on Apr. 7, 2011; 32 pages.
Office Action issued in U.S. Appl. No. 12/233,530 on Apr. 29, 2011; 11 pages.
Office Action issued in U.S. Appl. No. 11/967,405 on Apr. 27, 2011; 15 pages.
Office Action issued in U.S. Appl. No. 12/233,489 on May 13, 2011; 15 pages.
Office Action issued in U.S. Appl. No. 11/967,393 o n. Apr. 15, 2011; 12 pages.
Notice of Allowance issued in U.S. Appl. No. 11/967,865 on Jun. 24, 2011; 8 pages.
Anonymous; "Mastering Management"; Motor Age, vol. 25, No. 10; Oct. 2006; pp. 1-3.
Finin et al.; "KQML as an Agent Communication Language"; retrieved on Jul. 26, 2011; pp. 456-463. <http://portal.acm.org/citation.cfm?id=191322>.
Gerin et al.; "Flexible and Executable Hardware/Software Interface Modeling for Multiprocessor SOC Design Using SystemC"; IEEE; 2007; pp. 390-395.
Hahn; "A Domain Specific Modeling Language for Multi-Agent Systems"; ACM AAMAS; 2008; pp. 233-240.
Hu; "A Co-Design Modeling Approach for Computer Network Systems"; IEEE; 2007; pp. 685-693.

"IDe Partners with Journyx to Offer Customers Best-in-Class Time Management Solution"; PR Newswire; Mar. 8, 2005; Business Dateline.
Jennings et al.; "Autonomous Agents for Business Process Management"; 2000 Applied Artificial Intelligence; retrieved on Jul. 25, 2011; pp. 145-189. <http://citeseerx.ist.psu.edu/viewdoc/download?doi=10.1.1.58.624&rep=repl<ype=pdf>.
Kremic, Tibor; "Outsourcing Decision Support: A Survey of Benefits, Risks, and Decision Factor"; Supply Chain Management; V. 11; 2006; pp. 467-482.
Sarjoughian et al.; "CoSMOs: A Visual Environment for Component Based Modeling, Experimental Design and Simulation"; ACM; 2009; pp. 1-9.
Schaub, Thomas et al.; "Enterprise Management Application Providing Availability Control Checks on Revenue Budgets"; Aerospace & High Technology, ANTE: Abstracts in New Technologies and Engineering; Metdex, Mechanical & Transportation Engineering Abstracts; Date Unknown. p. 1.
"Trakware Systems Inc. Expands Management Team: Leading To-Order Software Provider Adds Experienced Global VP Sales and Marketing to its World-Class Team"; Canada NewsWire; Apr. 9, 2008.
Vescovi, Marcos and Hagmann, Christian; "Rules Engine for Enterprise System"; Areospace & High Technology, ANTE: Abstracts in New Technologies and Engineering; Metadex, Mechanical & Transportation Engineering Abstracts; Date Unknown; p. 1.
Office Action issued in U.S. Appl. No. 12/333,146 on Sep. 6, 2011; 21 pages.
Office Action issued in U.S. Appl. No. 12/333,146 on Feb. 2, 2012; 21 pages.
Notice of Allowance issued in U.S. Appl. No. 11/323,634 on Jan. 25, 2012; 5 pages.
Notice of Allowance issued in U.S. Appl. No. 11/396,327 on Sep. 28, 2011; 31 pages.
Office Action issued in U.S. Appl. No. 11/404,147 on Aug. 4, 2011; 26 pages.
Office Action issued in U.S. Appl. No. 12/233,479 on Oct. 27, 2011; 24 pages.
Office Action issued in U.S. Appl. No. 12/332,965 on Oct. 11, 2011; 6 pages.
Notice of Allowance issued in U.S. Appl. No. 12/233,462 on Sep. 2, 2011; 7 pages.
Notice of Allowance in U.S. Appl. No. 12/233,462 on Dec. 12, 2011; 6 pages.
Office Action issued in U.S. Appl. No. 12/233,289 on Oct. 27, 2011; 15 pages.
Notice of Allowance issued in U.S. Appl. No. 12/233,289 on Feb. 15, 2012; 11 pages.
Notice of Allowance issued in U.S. Appl. No. 12/233,457 on Nov. 3, 2011; 12 pages.
Notice of Allowance issued in U.S. Appl. No. 12/327,232 on Nov. 2, 2011; 16 pages.
Notice of Allowance issued in U.S. Appl. No. 12/327,590 on Dec. 28, 2011; 10 pages.
Office Action issued in U.S. Appl. No. 12/327,701 on Nov. 8, 2011; 20 pages.
Office Action issued in U.S. Appl. No. 12/233,087 on Aug. 18, 2011; 42 pages.
Notice of Allowance issued in U.S. Appl. No. 12/233,534 won Dec. 28, 2011; 7 pages.
Notice of Allowance issued in U.S. Appl. No. 11/322,382 on Jul. 25, 2011; 5 pages.
Notice of Allowanced issued in U.S. Appl. No. 11/322,398 on Oct. 18, 2011; 9 pages.
Examiner's Answer to Appeal Brief issued in U.S. Appl. No. 11/396,236 on Nov. 10, 2011; 19 pages.
Notice of Allowance issued in U.S. Appl. No. 11/396,259 on Aug. 5, 2011; 7 pages.
Office Action issued in U.S. Appl. No. 11/396,288 on Oct. 17, 2011; 38 pages.
Notice of Allowance issued in U.S. Appl. No. 11/396,250 on Dec. 7, 2011; 6 pages.

Notice of Allowance issued in U.S. Appl. No. 11/396,258 on Feb. 3, 2012; 12 pages.
Office Action issued in U.S. Appl. No. 11/396,252 on Nov. 10, 2011; 18 pages.
Notice of Allowance issued in U.S. Appl. No. 11/322,851 on Sep. 2, 2011; 8 pages.
Notice of Allowance issued in U.S. Appl. No. 11/322,851 on Mar. 1, 2012; 9 pages.
Notice of Allowance issued in U.S. Appl. No. 11/322,845; Nov. 13, 2011; 9 pages.
Office Action issued in U.S. Appl. No. 11/323,040 on Jul. 26, 2011; 34 pages.
Office Action issued in U.S. Appl. No. 11/397,026; Jul. 21, 2009; 28 pages.
Notice of Allowance issued in U.S. Appl. No. 11/397,026 on Jul. 20, 2011; 8 pages.
Notice of Allowance issued in U.S. Appl. No. 11/397,026 on Nov. 4, 2011; 8 pages.
Notice of Allowance issued in U.S. Appl. No. 11/397,026 on Feb. 23, 2012; 8 pages.
Notice of Allowance issued in U.S. Appl. No. 12/233,520 on Nov. 10, 2011; 22 pages.
Notice of Allowance issued in U.S. Appl. No. 12/233,417 on Sep. 14, 2011; 11 pages.
Notice of Allowance issued in U.S. Appl. No. 11/968,054 on Aug. 2, 2011; 5 pages.
Office Action issued in U.S. Appl. No. 12/233,458 on Oct. 12, 2011; 19 pages.
Office Action issued in U.S. Appl. No. 11/967,489 on Sep. 28, 2011; 7 pages.
Office Action issued in U.S. Appl. No. 11/967,489 on Feb. 6, 2012; 9 pages.
Notice of Allowance issued in U.S. Appl. No. 11/967,393 on Nov. 9, 2011; 9 pages.
Notice of Allowance issued in U.S. Appl. No. 12/327,354 on Aug. 9, 2011; 13 pages.
Office Action issued in U.S. Appl. No. 11/967,387 on Sep. 8, 2011; 14 pages.
Office Action issued in U.S. Appl. No. 12/233,075 on Aug. 4, 2011; 45 pages.
Notice of Allowance issued in U.S. Appl. No. 11/967,890 on Jul. 15, 2011; 7 pages.

* cited by examiner

COMPUTER READABLE MEDIUM FOR IMPLEMENTING SUPPLY CHAIN CONTROL USING SERVICE-ORIENTED METHODOLOGY

BACKGROUND

This specification relates to data processing systems implemented on computers, and more particular to data processing systems providing services in the nature of web services.

Enterprise software systems are generally large and complex. Such systems can require many different components, distributed across many different hardware platforms, possibly in several different geographical locations. Thus, the architecture of a large software application, i.e., what its components are and how they fit together, is an important aspect of its design for a successful implementation.

Web services are one technology for making the functionality of software applications available to other software, including other applications. A web service is a standards-based way of encapsulating the functionality of an application that other applications can locate and access. A service-oriented architecture is a distributed software model within which functionality is defined as independent web services. Within a service-oriented architecture, web services can be used in defined sequences according to business logic to form applications that enable business processes.

SUMMARY

This specification describes a services architecture design that provides enterprise services having supply chain control functionality at the level of an enterprise application. Enterprise services are web services that have an enterprise-level business value.

In its various aspects, the invention can be embodied in systems, methods, and computer program products. For example, a system in one embodiment implements a services architecture design that provides enterprise services having supply chain control functionality at the level of an enterprise application. The design includes a set of service operations, process components, and optionally deployment units. Suitable business objects are also described.

The subject matter described in this specification can be implemented to realize one or more of the following advantages. Effective use is made of process components as units of software reuse, to provide a design that can be implemented reliably in a cost effective way. Effective use is made of deployment units, each of which is deployable on a separate computer hardware platform independent of every other deployment unit, to provide a scalable design. Service interfaces of the process components define a pair-wise interaction between pairs of process components that are in different deployment units in a scalable way.

Details of one or more implementations of the subject matter described in this specification are set forth in the accompanying drawings and in the description below. Further features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
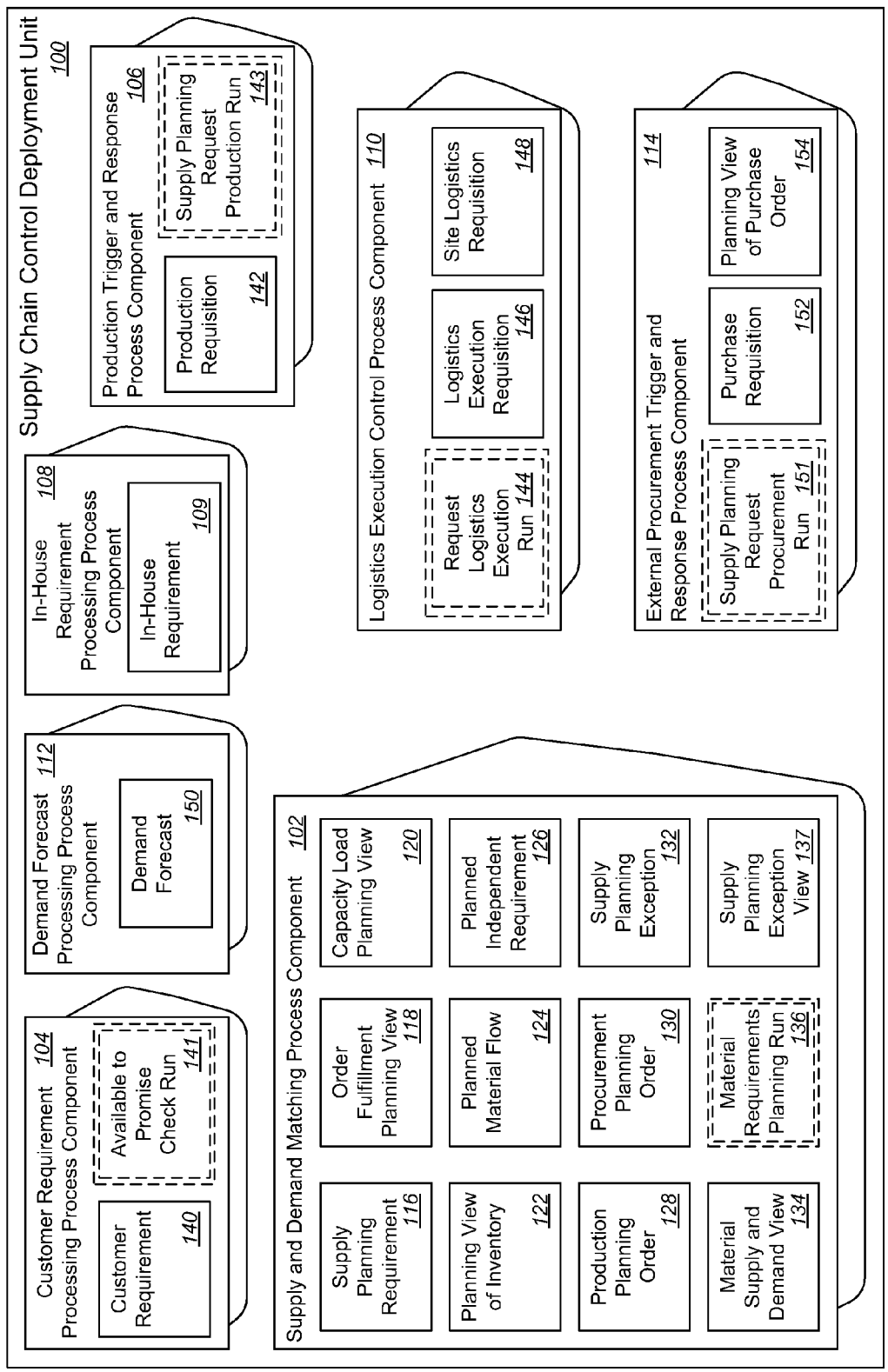
FIGS. 1A-1B illustrate a high-level view of a software architectural design and implementation of a suite enterprise software services having supply chain control functionality.
Figure 1B:
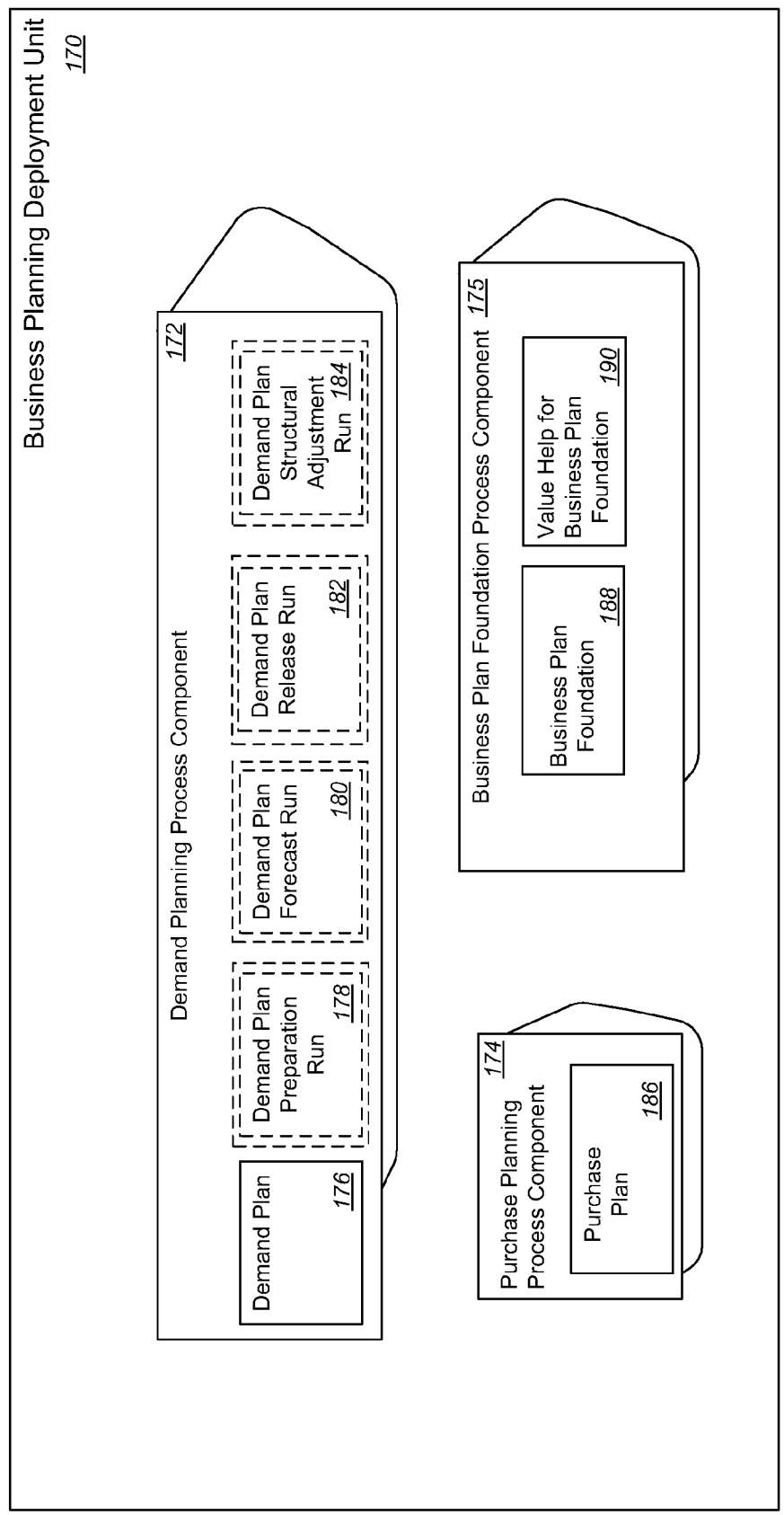

FIGS. 1A and 1B illustrate a high-level view of a software architectural design, and of application software implementations of the design, that provides a suite enterprise service operation, which can be organized into interfaces, having supply chain control application functionality.

The elements of the architecture include the business object, the process component, the service operation (or simply, the operation), the service interface, the message, and the deployment unit. The elements can also include process agents and reuse service components. These will be generally described below.

In some implementations, the software is implemented to be deployed on an application platform that includes a foundation layer that contains all fundamental entities that can be used from multiple deployment units. These entities can be process components, business objects or reuse service components. A reuse service component is a piece of software that is reused in different transactions. A reuse service component is used by its defined interfaces, which can be, e.g., local APIs (Application Programming Interfaces) or service interfaces.

The architectural design is a specification of a computer software application, and elements of the architectural design can be implemented to realize a software application that implements enterprise application service interfaces. The elements of the architecture are at times described in this specification as being contained or included in other elements; for example, a process component is described as being contained in a deployment unit. It should be understood, however, that such operational inclusion can be realized in a variety of ways and is not limited to a physical inclusion of the entirety of one element in another.

The architectural elements include the business object. A business object is a representation of a type of a uniquely identifiable business entity (an object instance) described by a structural model. Processes operate on business objects.

A business object represents a specific view on some well-defined business content. A business object represents content, and instances of business objects include content, which a typical business user would expect and understand with little explanation. Whether an object as a type or an instance of an object is intended by the term "object" is generally clear from the context, so the distinction will be made explicitly only when necessary. Also, for convenience and brevity, an object instance may be described in this specification as being or including a real world event, activity, item, or the like; however, such description should be understood as stating that the object instance represents (i.e., contains data representing) the respective event, activity, item, or the like. Properly implemented, business objects are implemented free of redundancies.

Business objects are further categorized as business process objects, master data objects, mass data run objects, dependent objects, and transformed objects. A master data object is an object that encapsulates master data (i.e., data that is valid for a period of time). A business process object, which is the kind of business object generally found in a process component, is an object that encapsulates transactional data (i.e., data that is valid for a point in time). A mass data run object is an application object that executes an algorithm for a particular mass data run. An instance of a mass data run object embodies or contains a particular set of selections and parameters. A mass data run object implements an algorithm that modifies, manages, and/or processes a large amount of data in multiple transactions, possibly but not necessarily with parallel processing. A dependent object is a business object used as a reuse part in another business object. A dependent object represents a concept that cannot stand by itself from a business point of view. Instances of dependent objects only occur in the context of a non-dependent business object. A transformed object is a transformation of multiple business objects for a well-defined purpose. It transforms the structure of multiple business objects into a common structure. A transformed object does not have its own persistency.

The architectural elements also include the process component. A process component is a software package that realizes a business process and generally exposes its functionality as services. The functionality includes the ability to perform all or parts of particular kinds of business transactions. A process component contains one or more semantically related business objects. Any business object belongs to no more than one process component.

Process components are modular and context-independent. That they are context-independent means that a process component is not specific to any specific application and is reusable. The process component is the smallest (most granular) element of reuse in the architecture.

The architectural elements also include the operation. An operation belongs to exactly one process component. A process component generally has multiple operations. Operations can be synchronous or asynchronous, corresponding to synchronous or asynchronous process agents, which will be described below. An operation is the smallest, separately-callable function, described by a set of data types used as input, output, and fault parameters, or some combination of them, serving as a signature. For convenience in supporting use of the operations supported by a system implementing elements of the design, such a system can optionally include a repository of service descriptions that includes a standards-based description of each of the supported service operations.

The architectural elements also optionally include the service interface, which may be referred to simply as an interface. An interface is a named group of operations. Each operation belongs to exactly one interface. An interface belongs to exactly one process component. A process component might implement multiple interfaces. In some implementations, an interface will have only inbound or outbound operations, but not a mixture of both. One interface can include both synchronous and asynchronous operations. All operations of the same type (either inbound or outbound) which belong to the same message choreography will preferably belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. An operation can use multiple message types for inbound, outbound, or error messages. When two process components are in different deployment units, invocation of an operation of one process component by the other process component is accomplished by an operation on the other process component sending a message to the first process component.

The architectural elements also include the process agent. Process agents do business processing that involves the sending or receiving of messages. Each operation will generally have at least one associated process agent. A process agent can be associated with one or more operations. Process agents can be either inbound or outbound, and either synchronous or asynchronous.

Asynchronous outbound process agents are called after a business object changes, e.g., after a create, update, or delete of a business object instance.

Synchronous outbound process agents are generally triggered directly by a business object.

An outbound process agent will generally perform some processing of the data of the business object instance whose change triggered the agent or caused the agent to be called. An outbound agent triggers subsequent business process steps by sending messages using well-defined outbound services to another process component, which generally will be in another deployment unit, or to an external system. An outbound process agent is linked to the one business object that triggers the agent, but it is sent not to another business object but rather to another process component. Thus, the outbound process agent can be implemented without knowledge of the exact business object design of the recipient process component.

Inbound process agents are called after a message has been received. Inbound process agents are used for the inbound part of a message-based communication. An inbound process agent starts the execution of the business process step requested in a message by creating or updating one or multiple business object instances. An inbound process agent is not the agent of a business object but of its process component. An inbound process agent can act on multiple business objects in a process component.

Synchronous agents are used when a process component requires a more or less immediate response from another process component, and is waiting for that response to continue its work.

Operations and process components are described in this specification in terms of process agents. However, in alternative implementations, process components and operations can be implemented without use of agents using other conventional techniques to perform the functions described in this specification.

The architectural elements also include the deployment unit. A deployment unit includes one or more process components and, optionally, one or more business objects, that are deployed together on a single computer system platform. Conversely, separate deployment units can be deployed on separate physical computing systems. For this reason, a deployment unit boundary defines the limits of an application-defined transaction, i.e., a set of actions that have the ACID properties of atomicity, consistency, isolation, and durability. To make use of database manager facilities, the architecture requires that all operations of such a transaction be performed on one physical database; as a consequence, the processes of such a transaction must be performed by the process components of one instance of one deployment unit.

The process components of one deployment unit interact with those of another deployment unit using messages passed through one or more data communication networks or other suitable communication channels. Thus, a deployment unit deployed on a platform belonging one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units is through service operations, a deployment unit can be replaced by other another deployment unit as long as the new deployment unit supports the operations depended upon by other deployment units. Thus, while deployment units can depend on the external interfaces of process components in other deployment units, deployment units are not dependent on process component interactions (i.e., interactions between process components involving their respective business objects, operations, interfaces, and messages) within other deployment units. Similarly, process components that interact with other process components or external systems only through messages, e.g., as sent and received by operations, can also be replaced as long as the replacement supports the operations of the original.

Interactions between process components that occur only within a deployment unit are not constrained to using service operations. These can be implemented in any convenient fashion.

In contrast to a deployment unit, the foundation layer does not define a limit for application-defined transactions. Deployment units communicate directly with entities in the foundation layer, which communication is typically not message based. The foundation layer is active in every system instance on which the application is deployed. Business objects in the foundation layer will generally be master data objects. In addition, the foundation layer will include some business process objects that are used by multiple deployment units. Master data objects and business process objects that should be specific to a deployment unit are assigned to their respective deployment unit.

As shown in FIG. 1A, a Supply Chain Control deployment unit 100 includes a Supply and Demand Matching process component 102, a Customer Requirement Processing process component 104, a Production Trigger and Response process component 106, an In-House Requirement Processing process component 108, a Logistics Execution Control process component 110, a Demand Forecast Processing process component 112, and an External Procurement Trigger and Response process component 114.

The Supply and Demand Matching process component 102 manages the tasks performed to ensure that sufficient material receipt elements exist to cover material demand while taking available capacity into account. The Supply and Demand Matching process component 102 includes a Supply Planning Requirement business object 116, an Order Fulfillment Planning View transformed object 118, a Capacity Load Planning View transformed object 120, a Planning View of Inventory business object 122, a Planned Material Flow business object 124, a Planned Independent Requirement business object 126, a Production Planning Order business object 128, a Procurement Planning Order business object 130, a Supply Planning Exception business object 132, a Material Supply and Demand View transformed object 134, a Material Requirements Planning Run mass data run object 136, and a Supply Planning Exception View transformed object 137.

The Supply Planning Requirement business object 116 is a requirement that is derived from a business document, such as a sales order, an internal requirement, or a scheduling agreement, and to which details on the anticipated availability date have been added. It contains the material quantities required on specific dates, as well as information on which quantities are available on which dates.

The Order Fulfillment Planning View transformed object 118 is a single-level or multi-level planning view of receipts that are needed to fulfill a material requirement or of requirements that use a material receipt. The Capacity Load Planning View transformed object 120 is a planning view of the capacity load of a resource in an evaluation period. The Planning View of Inventory business object 122 is a view of a material stock, aggregated at the level of a supply planning area. The Planned Material Flow business object 124 is a material flow from a planned receipt to a planned requirement for a predetermined quantity. The Planned Independent Requirement business object 126 is an independent requirement derived from a forecast, and planned for a material for a particular time period in a particular supply planning area.

The Production Planning Order business object 128 is a request made to a planning area (e.g., supply planning area) to initiate the production of a particular quantity of a material on a defined date. The Procurement Planning Order business object 130 is a planned order for procuring materials that is to be placed with an external vendor. It defines required quantities and availability dates. The Supply Planning Exception business object 132 is an exception that reports an incorrect planning situation, or an unsolved problem or error in supply planning. The Supply Planning Exception View transformed object 137 is a view that provides both aggregated and detailed information for supply planning exceptions.

The Material Supply and Demand View transformed object 134 is an overview of the supply and demand situation for a particular material in a supply planning area. It provides supply planning functions and a projection of the development of the stock. The Material Requirements Planning Run mass data run object 136 is a specification of an automated run that plans material requirements based on selected material supply and demand views.

The Customer Requirement Processing process component 104 controls customer requirements in the supply chain, e.g., checking material availability, receiving, preparing, and passing customer requirements on to supply planning and logistics, and providing feedback on fulfillment. The Customer Requirement Processing process component 104 includes a Customer Requirement business object 140 and an Available to Promise Check Run mass data run object 141.

The Customer Requirement business object 140 is a requirement that is derived from a sales order, quotation, or service order and to which details on the anticipated availability date of materials required to fulfill the requirement may be added. The business object 140 includes requirements for the quantities of materials used at specific dates, as well as information about which materials will be available or delivered in particular quantities at particular dates. The Available to Promise Check Run mass data run object 141 is a specification of an automated run that performs an available-to-promise check based on customer requirements.

The Production Trigger and Response process component 106 is the interface between planning and production. It handles production requisitions, receives information about the production progress, and updates the planning data accordingly. The Production Trigger and Response process component 106 includes a Production Requisition business object 142 and a Supply Planning Request Production Run mass data run object 143. The Production Requisition business object 142 is a requisition to production execution to produce a certain quantity of a specific material by a requested due date. The Supply Planning Request Production Run mass data run object 143 is a specification of an automated run that creates production requisitions for materials based on selected production planning orders.

The In-House Requirement Processing process component 108 processes in-house requirements. Using an interface to self-service procurement, the In-House Requirement Processing process component 108 receives, prepares, and passes the in-house requirements to supply planning and logistics. The In-House Requirement Processing process component 108 includes an In-House Requirement business object 109. The In-House Requirement business object 109 is a requirement that expresses an internal customer demand from within the company.

The Logistics Execution Control process component 110 creates, controls, and monitors the supply chain execution activities that are necessary for the fulfillment of an order on a macro logistics level. The Logistics Execution Control process component 110 triggers the necessary site logistics activities and receives information about the supply chain execution progress. The Logistics Execution Control process component 110 includes a Request Logistics Execution Run mass data run object 144, a Logistics Execution Requisition business object 146, and a Site Logistics Requisition business object 148.

The Request Logistics Execution Run mass data run object 144 is a specification of an automated run releasing selected logistics execution activities of logistics execution requisitions that are due or overdue. The Logistics Execution Requisition business object 146 is a requisition to logistics to control, trigger, and monitor the execution of a logistic process on a macro logistics level to fulfill an order. The Site Logistics Requisition business object 148 is a request to logistics execution to execute a site logistics process for a certain quantity of material, by a certain time.

The Demand Forecast Processing process component 112 receives, processes, and subsequently releases demand forecasts to planned independent requirements. The Demand Forecast Processing process component 112 includes a Demand Forecast business object 150. The Demand Forecast business object 150 is a forecast of a material demand in a particular supply planning area.

The External Procurement Trigger and Response process component 114 manages all of the tasks necessary for processing procurement planning orders and interfacing to purchasing from a supply planning perspective. The External Procurement Trigger and Response process component 114 includes a Supply Planning Request Production Run mass data run object 151, a Purchase Requisition business object 152, and a Planning View of Purchase Order business object 154. The Supply Planning Request Procurement Run mass data run object 151 is a specification of an automated run that creates purchase requisitions for materials based on selected procurement planning orders. The Purchase Requisition business object 152 is a requisition to purchasing for the external procurement of materials planned in supply and demand matching. The Purchase Requisition business object 152 is derived from the procurement planning order and describes which materials are to be procured in what quantities, and at what time. The Planning View of Purchase Order business object 154 is a planning view of the materials, date, quantities, delivery conditions, parties, and sources of supply of a purchase order that are relevant to planning.

As shown in FIG. 1B, a Business Planning deployment unit 170 includes a Demand Planning process component 172, a Purchase Planning process component 174, and a Business Plan Foundation process component 175. The Demand Planning process component 172 provides accurate and measurable estimates of future demand. The Demand Planning process component 172 includes a Demand Plan business object 176, a Demand Plan Preparation Run mass data run object 178, a Demand Plan Forecast Run mass data run object 180, a Demand Plan Release Run mass data run object 182, and a Demand Plan Structural Adjustment Run mass data run object 184.

The Demand Plan business object 176 is a collection of quantitative forecasts of the product demands within a planning period. These forecasts are generated as required (e.g., at product, brand, or customer group level). The Demand Plan Preparation Run mass data run object 178 is a specification for an automated run that prepares a set of demand plans for forecasting. The Demand Plan Forecast Run mass data run object 180 is a specification for an automated run that performs forecasting and planning of material demands in certain supply planning areas, based on a set of demand plans. The Demand Plan Release Run mass data run object 182 is a specification for an automated run that releases forecasted quantities of material in a certain supply planning area, for a specified horizon, to supply chain planning, based on a set of demand plans. The Demand Plan Structural Adjustment Run mass data run object 184 is a specification for an automated run that adjusts the time series for selected demand plans in business intelligence, according to structural changes that may have been made to them.

The Purchase Planning process component 174 provides accurate and measurable estimates of future purchasing volume. The Purchase Planning process component 174 includes a Purchase Plan business object 186. The Purchase Plan business object 186 is a structural description of a plan referring to actual and forecast data based on past purchasing volume.

The Business Plan Foundation process component 175 includes a Business Plan Foundation dependent object 188 and a Value Help for Business Plan Foundation technical object 190. The Business Plan Foundation dependent object 188 is a generic basis of a plan that abstracts the structure and references the planning data. The Value Help for Business Plan Foundation technical object 190 is a value-help enabler for elements of the Business Plan Foundation dependent object 188.

Figure 2:
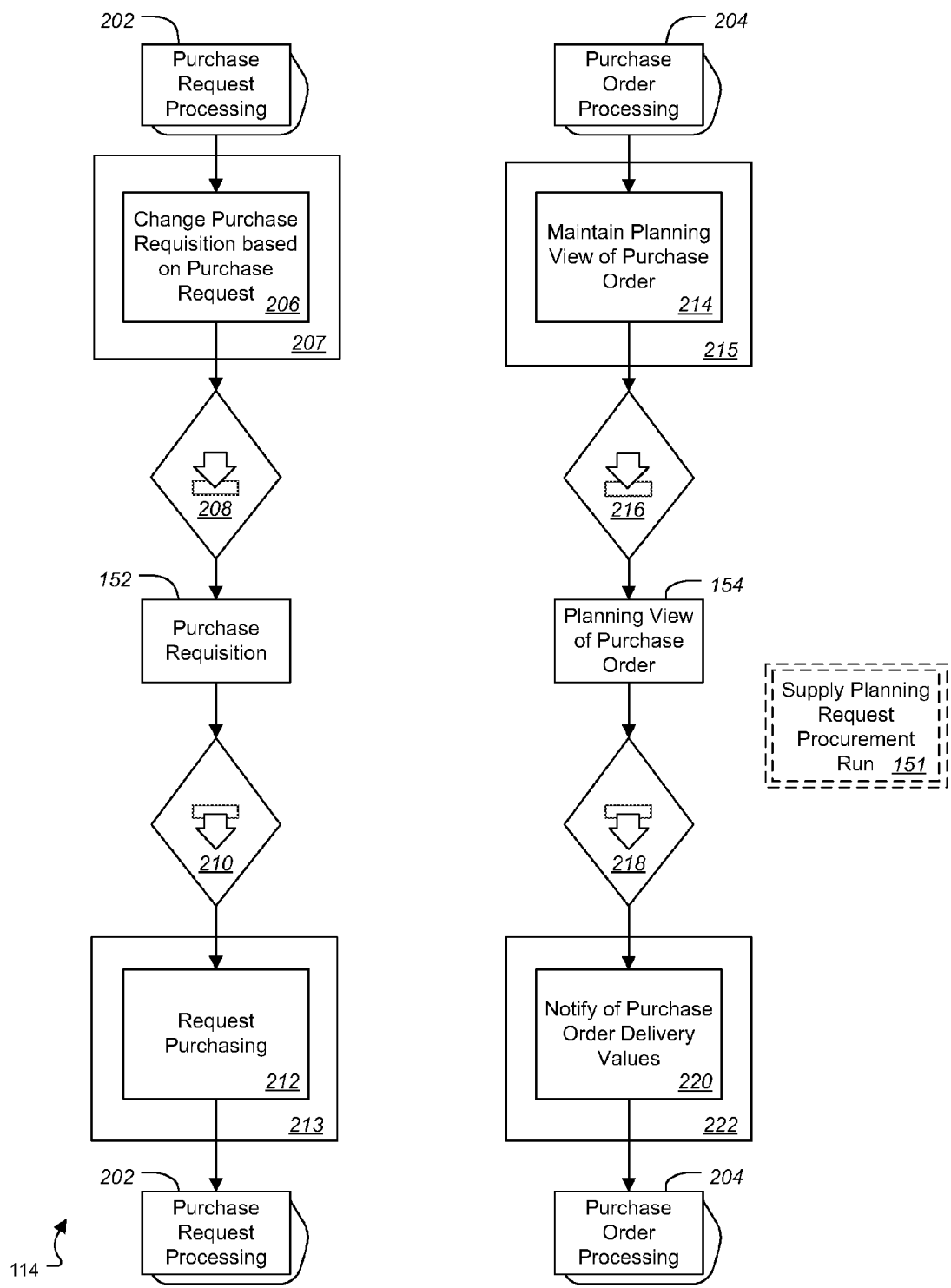
FIG. 2 is a block diagram showing an External Procurement Trigger and Response process component.

FIG. 2 is a block diagram showing the External Procurement Trigger and Response process component 114 (FIG. 1A). The External Procurement Trigger and Response process component 114 manages the tasks used in processing procurement planning orders and interfacing to purchasing from a supply planning perspective. For convenience in describing this process component, a number of other process components are shown in the figure; these other process components are not part of the process component being described. These other process components are used to represent software external to the process component in describing its interactions with the external software; however, while the external software can be implemented as such process components, this is not required. These other process components include a Purchase Request Processing process component 202 and a Purchase Order Processing process component 204. The Purchase Request Processing process component 202 creates, changes, and processes purchase requests to locate appropriate external sources of supply. The Purchase Order Processing process component 204 creates and maintains purchase orders and purchase order confirmations.

The Purchase Request Processing process component 202 sends a message to the External Procurement Trigger and Response process component 114. The message is received in a Change Purchase Requisition Based on Purchase Request operation 206. The operation 206 confirms to the requester the extent to which a purchase requisition has been fulfilled. The Change Purchase Requisition Based on Purchase Request operation 206 is included in a Purchasing In interface 207. The operation 206 uses a Change Purchase Requisition Based on Purchase Request asynchronous inbound process agent 208 to update the Purchase Requisition business object 152. The Change Purchase Requisition Based on Purchase Request asynchronous inbound process agent 208 receives the rejection data of the purchase request confirmation and updates the purchase requisition. The Purchase Requisition business object 152 represents a requisition to purchasing for the external procurement of materials planned in supply and demand matching. The purchase requisition is derived from the procurement planning order and describes which materials are to be procured in what quantities, and at what time. The operation 206 sends a purchase request confirmation to update the Purchase Requisition business object 152 if input is received from the Purchase Request Processing process component 202.

The Purchase Requisition business object 152 uses a Request Purchasing from Purchase Requisition to Purchase Request Processing asynchronous outbound process agent 210 to invoke a Request Purchasing operation 212. The Request Purchasing from Purchase Requisition to Purchase Request Processing asynchronous outbound process agent 210 sends new purchase requisition or changes of an existing purchase requisition to purchasing.

The Request Purchasing operation 212 requests the procurement of goods and/or services. The Request Purchasing operation 212 is included in a Purchasing Out interface 213. The operation 212 sends a purchase request to the Purchase Request Processing process component 202.

The Purchase Order Processing process component 204 sends a message to the External Procurement Trigger and Response process component 114. The message is received in a Maintain Planning View of Purchase Order operation 214. The operation 214 updates the planning view of purchase order data with information about new or changed purchase orders. The operation 214 is included in an Ordering Notification In interface 215. The Maintain Planning View of Purchase Order operation 214 uses a Maintain Planning View of Purchase Order asynchronous inbound process agent 216 to update the Planning View of Purchase Order business object 154. The operation 214 sends a purchase order notification to update the Planning View of Purchase Order business object 154 if input is received from the Purchase Order Processing process component 204.

The Planning View of Purchase Order business object 154 can receive updated information and send the update into another component to perform further operations. A Notify of Purchase Order Delivery Values from Planning View of Purchase Order to Purchase Order Processing asynchronous outbound process agent 218 receives information from the Planning View of Purchase Order business object 154. The Planning View of Purchase Order business object 154 represents a planning view of the materials, date, quantities, delivery conditions, parties, and sources of supply of a purchase order that are relevant to planning.

The Notify of Purchase Order Delivery Values from Planning View of Purchase Order to Purchase Order Processing asynchronous outbound process agent 218 invokes a Notify of Purchase Order Delivery Values operation 220, which notifies purchasing of the fulfillment of a purchase order. The operation 220 is included in a Fulfillment Out interface 222. The operation 220 sends a purchase request to the Purchase Order Processing process component 204.

The External Procurement Trigger and Response process component 114 also includes business objects that may not have external interfaces. These business objects include the Supply Planning Request Procurement Run business object 151. The Supply Planning Request Procurement Run business object 151 is a specification of an automated run that creates purchase requisitions for materials based on selected procurement planning orders.

Figure 3:
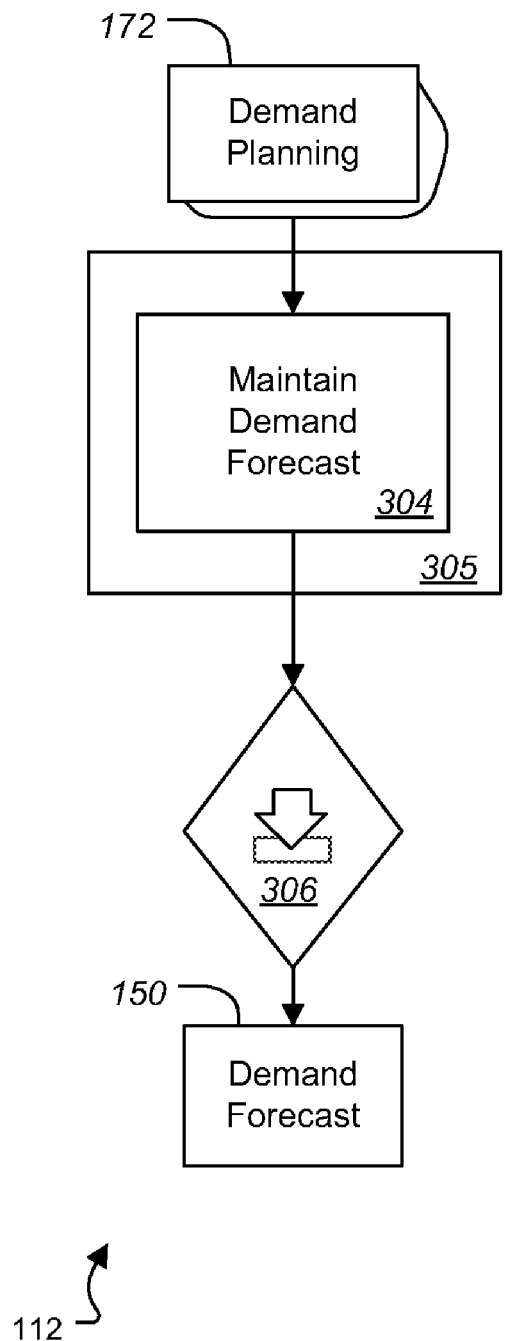
FIG. 3 is a block diagram showing a Demand Forecast Processing process component.

FIG. 3 is a block diagram showing the Demand Forecast Processing process component 112 (FIG. 1A). The Demand Forecast Processing process component 112 receives, processes and subsequently releases demand forecasts to planned independent requirements. For convenience in describing this process component, another process component is shown in the figure; the other process component is not part of the process component being described. The other process component is used to represent software external to the process component in describing its interactions with the external software; however, while the external software can be implemented using other process components, this is not required. The other process component in this example includes the Demand Planning process component 172. The Demand Planning process component 172 provides accurate and measurable estimates of future demand.

The Demand Planning processing component 172 sends a message to the Demand Forecasting processing component 112. The message is received in a Maintain Demand Forecast operation 304. The Maintain Demand Forecast operation 304 creates, updates and deletes the demand forecast object with the given forecast data. The Maintain Demand Forecast operation 304 is included in a Demand Forecasting In interface 305. The operation 304 uses a Maintain Demand Forecast asynchronous inbound process agent 306 to update the Demand Forecast business object 150. The Demand Forecast business object 150 represents a forecast of a material demand in a particular supply planning area.

Figure 4:
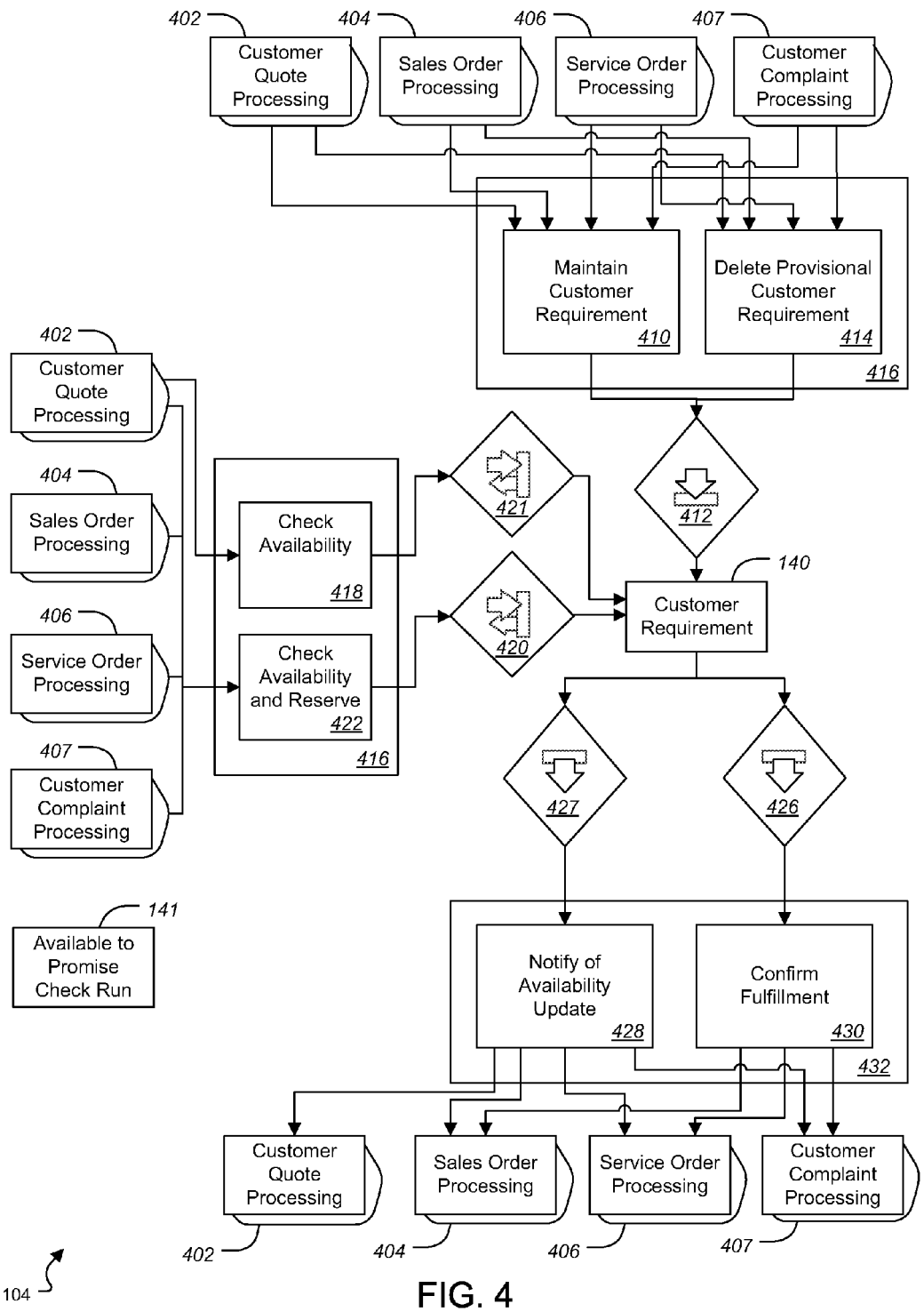
FIG. 4 is a block diagram showing a Customer Requirement Processing process component.

FIG. 4 is a block diagram showing the Customer Requirement Processing process component 104 (FIG. 1A). The Customer Requirement Processing process component 104 handles the controlling of customer requirements in the supply chain. This involves checking material availability, receiving, preparing, and passing customer requirements on to supply planning and logistics, and providing feedback on fulfillment.

For convenience in describing this process component, a number of other process components are shown in the figure; these other process components are not part of the process component being described. These other process components are used to represent software external to the process component in describing its interactions with the external software; however, while the external software can be implemented as such process components, this is not required. These other process components include a Customer Quote Processing process component 402, a Sales Order Processing process component 404, a Service Order Processing process component 406, and a Customer Complaint Processing process component 407. The Customer Quote Processing process component 402 processes quotes for customers offering the delivery of goods according to specific terms. The Sales Order Processing process component 404 processes customer requests to sellers for the delivery of goods, on specific dates, for specific quantities, and for specific prices. The Service Order Processing process component 406 creates, plans, and fulfills service orders, which can be executed by a service engineer at a customer site for an agreed price. The Customer Complaint Processing process component 407 processes complaints received from customers.

As shown in FIG. 4, the Customer Quote Processing process component 402, the Sales Order Processing process component 404, the Service Order Processing process component 406, or the Customer Complaint Processing process component 407 invokes a Maintain Customer Requirement operation 410 or a Delete Provisional Customer Requirement operation 414. The Maintain Customer Requirement operation 410 creates or changes a customer requirement. The Delete Provisional Customer Requirement operation 414 deletes provisional customer requirements that have been created by a synchronous check availability and reserve operation. The operations 410 and 414 are included in a Fulfillment In interface 416.

Either the Maintain Customer Requirement operation 410 or the Delete Provisional Customer Requirement operation 414 uses a Maintain Customer Requirement asynchronous inbound process agent 412 to update the Customer Requirement business object 140. The Customer Requirement business object 140 is a requirement that is derived from a sales order, quotation, or service order and to which details on the anticipated availability date of materials required to fulfill the requirement may be added. It contains the quantities of materials required at specific dates as well as information about which materials will be available or delivered in which quantities at which dates. The Maintain Customer Requirement asynchronous inbound process agent 412 receives a customer requirement fulfillment request and updates the corresponding customer requirement instance.

As shown in FIG. 4, the process components 402, 404, 406, and 407 can also invoke a Check Availability operation 418 or a Check Availability and Reserve operation 422. The Check Availability operation 418 checks the availability of certain amounts of materials at certain dates and sends this information back to the caller. The Check Availability and Reserve operation 422 checks and confirms the availability of a specific amount of material. The operations 418 and 422 are included in the Fulfillment In interface 416.

The Check Availability operation 418 uses a Check Availability synchronous inbound process agent 421 to update the Customer Requirement business object 140. The Check Availability synchronous inbound process agent 421 receives a request for a non-reserving available-to-promise check and triggers the corresponding customer requirement services.

The Check Availability and Reserve operation 422 uses a Check Availability and Reserve synchronous inbound process agent 420 to update the Customer Requirement business object 140. The Check Availability and Reserve synchronous inbound process agent 420 receives a request for a reserving available-to-promise check and triggers the corresponding customer requirement services.

An update or a creation of the Customer Requirement business object 140 can trigger a Confirm Fulfillment of Customer Requirement asynchronous outbound process agent 426 to invoke a Confirm Fulfillment operation 430 in a Fulfillment Out interface 432. The Confirm Fulfillment of Customer Requirement asynchronous outbound process agent 426 sends the fulfillment confirmation to the process component that requested the fulfillment. The Confirm Fulfillment operation 430 confirms the partial or complete fulfillment of a customer requirement to the creator of the requirement.

An update or a creation of the Customer Requirement business object 140 may also trigger a Notify of Availability Update from Customer Requirement asynchronous outbound process agent 427 to invoke a Notify of Availability Update operation 428 in the Fulfillment Out interface 432. The Notify of Availability Update from Customer Requirement asynchronous outbound process agent 427 sends the availability update notification to the process component that requested the availability check. The Notify of Availability Update operation 428 notifies the creator of a customer requirement about an updated availability for requested materials.

Figure 5A:
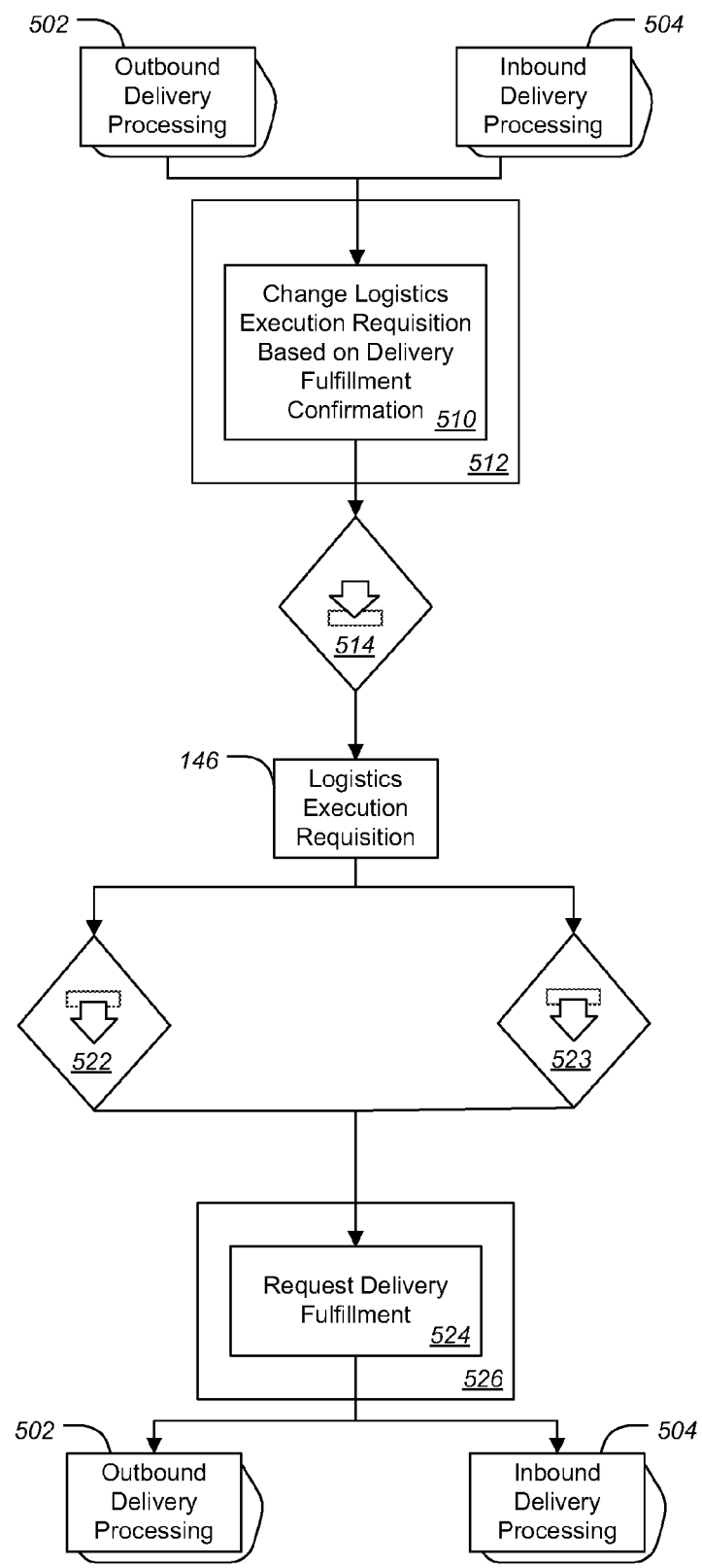
FIGS. 5A and 5B are block diagrams collectively showing a Logistics Execution Control process component.
Figure 5B:
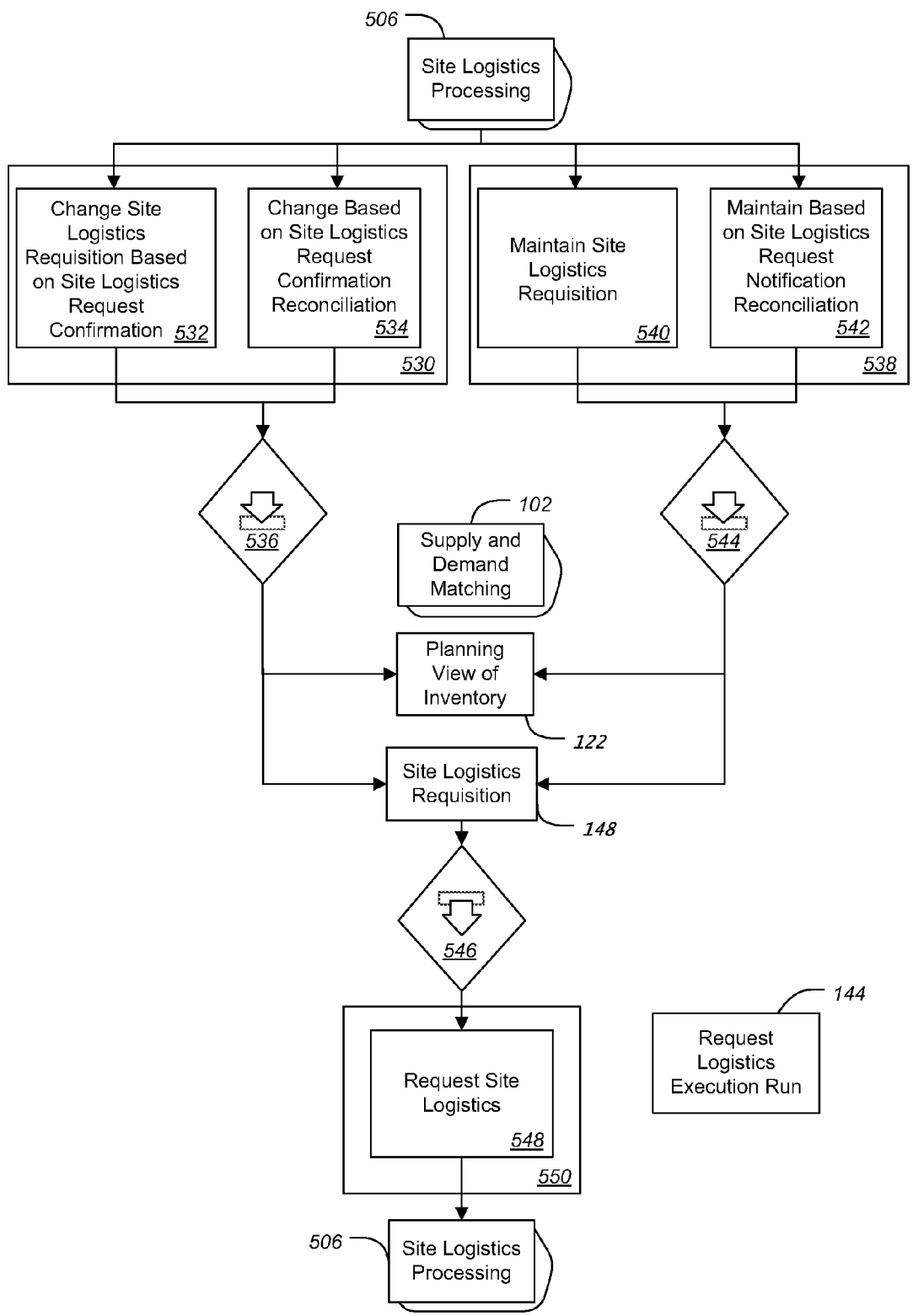

FIGS. 5A and 5B are block diagrams collectively showing a Logistics Execution Control process component 110. The Logistics Execution Control process component 110 creates, controls and monitors the supply chain execution activities that are necessary for the fulfillment of an order on a macro logistics level. The Logistics Execution Control process component 110 triggers site logistics activities and receives information about the supply chain execution progress.

For convenience in describing this process component, a number of other process components are shown in the figure; these other process components are not part of the process component being described. These other process components are used to represent software external to the process component in describing its interactions with the external software; however, while the external software can be implemented as such process components, this is not required. These other process components include an Outbound Delivery Processing process component 502, an Inbound Delivery Processing process component 504, a Site Logistics Processing process component 506, and the Supply and Demand Matching process component 102.

The Outbound Delivery Processing process component 502 manages and processes the outbound delivery requirements for shipping goods to a product recipient. It combines all document-based tasks for the outbound delivery process, and enables communication with the originating document (e.g., fulfillment), the product recipient, and invoicing.

The Inbound Delivery Processing process component 504 manages and processes the inbound delivery requirements for received goods from a vendor. It combines all document-based tasks for the inbound delivery process, and enables communication with the originating document (e.g., fulfillment), the vendor, and invoicing.

The Site Logistics Processing process component 506 prepares, executes and confirms logistics processes within a site. Logistics processes, which are based on site logistics process models, include picking, packing, shipping, receiving as well as value added services.

The Supply and Demand Matching process component 102 manages all of the tasks necessary to ensure that sufficient material receipt elements exist to cover material demand while taking available capacity into account.

As shown in FIGS. 5A and 5B, the Logistics Execution Control process component 110 includes the Planning View of Inventory business object 122, the Logistics Execution Requisition business object 146, the Site Logistics Requisition business object 148, and the Request Logistics Execution Run business object 144. The Planning View of Inventory business object 122 represents a specification of an automated run releasing selected logistics execution activities of Logistics Execution Requisitions that are due or overdue. The Logistics Execution Requisition business object 146 represents a requisition to logistics to control, trigger and monitor the execution of a logistic process on a macro logistics level to fulfill an order. The Site Logistics Requisition business object 148 is a request to logistics execution to execute a site logistics process for a certain quantity of material, by a certain time. The Request Logistics Execution Run business object 144 represents a specification of an automated run releasing selected logistics execution activities of logistics execution requisitions that are due or overdue.

The Logistics Execution Control process component 110 includes a Change Logistics Execution Requisition Based on Delivery Fulfillment Confirmation operation 510 in a Fulfillment In interface 512. The Change Logistics Execution Requisition Based on Delivery Fulfillment Confirmation operation 510 updates logistics execution control with fulfillment confirmation data from an inbound or outbound delivery request. The Change Logistics Execution Requisition Based on Delivery Fulfillment Confirmation operation 510 can trigger a Change Logistics Execution Requisition Based on Delivery Fulfillment Confirmation asynchronous inbound process agent 514 to update the Logistics Execution Requisition business object 146. The Change Logistics Execution Requisition Based on Delivery Fulfillment Confirmation asynchronous inbound process agent 514 updates a logistic execution request with fulfillment data from outbound or inbound delivery processing.

An update to the Logistics Execution Requisition business object 146 may trigger a Request Fulfillment from Logistics Execution Requisition to Outbound Delivery Processing asynchronous outbound process agent 522 and/or a Request Fulfillment from Logistics Execution Requisition to Inbound Delivery Processing asynchronous outbound process agent 523. The Request Fulfillment from Logistics Execution Requisition to Outbound Delivery Processing 522 requests fulfillment of an outbound delivery from outbound delivery processing. The Request Fulfillment from Logistics Execution Requisition to Inbound Delivery Processing asynchronous outbound process agent 523 requests fulfillment of an inbound delivery from inbound delivery processing.

If the Request Fulfillment from Logistics Execution Requisition to Outbound Delivery Processing asynchronous outbound process agent 522 is triggered, the asynchronous outbound process agent 522 can invoke a Request Delivery Fulfillment operation 524 in a Fulfillment Out interface 526 to create or update an outbound delivery request. If the Request Fulfillment from Logistics Execution Requisition to Inbound Delivery Processing asynchronous outbound process agent 523 is triggered, the Request Delivery Fulfillment operation 524 can be invoked to create or update an inbound delivery request.

As shown in FIG. 5B, a Site Logistics Processing In interface 530 includes a Change Site Logistics Requisition Based on Site Logistics Request Confirmation operation 532 and a Change Based on Site Logistics Request Confirmation Reconciliation operation 534. The Change Site Logistics Requisition Based on Site Logistics Request Confirmation operation 532 updates logistics execution control with confirmation data and inventory change data from a site logistics request. The Change Based on Site Logistics Request Confirmation Reconciliation operation 534 reconciles a site logistics requisition with its related site logistics request.

The operations 532 and 534 trigger a Maintain Site Logistics Requisition Based on Site Logistics inbound process agent 536. The Maintain Site Logistics Requisition Based on Site Logistics inbound process agent 536 performs the creation or updating of a site logistics requisition and also performs the reconciliation of a site logistics requisition. The Maintain Site Logistics Requisition Based on Site Logistics inbound process agent 536 asynchronously updates the Site Logistics Requisition business object 148. The Maintain Site Logistics Requisition Based on Site Logistics inbound process agent 536 may also synchronously update the Planning View of Inventory business object 122. The Supply and Demand Matching process component 102 can also receive an update from the Maintain Site Logistics Requisition based on Site Logistics inbound process agent 536.

A Site Logistics Notification In interface 538 includes a Maintain Site Logistics Requisition operation 540 and a Maintain Based on Site Logistics Request Notification Reconciliation operation 542. The Maintain Site Logistics Requisition operation 540 creates or updates a site logistics requisition with relevant inventory changes from a site logistics request. The Maintain Based on Site Logistics Request Notification Reconciliation operation 542 reconciles a site logistics requisition with its related site logistics request.

The operations 540 and 542 trigger a Maintain Site Logistics Requisition based on Site Logistics Request Notification inbound process agent 544. The Maintain Site Logistics Requisition based on Site Logistics Request Notification inbound process agent 544 creates or updates a site logistics requisition and also performs the reconciliation of a site logistics requisition. The Maintain Site Logistics Requisition based on Site Logistics Request Notification inbound process agent 544 asynchronously updates the Site Logistics Requisition business object 148. The Maintain Site Logistics Requisition based on Site Logistics Request Notification inbound process agent 544 may also synchronously update the Planning View of Inventory business object 122. The Supply and Demand Matching process component 102 can also receive an update from the Maintain Site Logistics Requisition based on Site Logistics Request Notification inbound process agent 544.

An update of the Site Logistics Requisition business object 148 can trigger a Request Site Logistics Processing from Site Logistics Requisition to Site Logistics Processing asynchronous outbound process agent 546. The Request Site Logistics Processing from Site Logistics Requisition to Site Logistics Processing asynchronous outbound process agent 546 requests site logistics processing. The Request Site Logistics Processing from Site Logistics Requisition to Site Logistics Processing asynchronous outbound process agent 546 can invoke a Request Site Logistics operation 548 in a Site Logistics Processing Out interface 550 to request the creation, updating, or deletion of a site logistics request.

Figure 6:
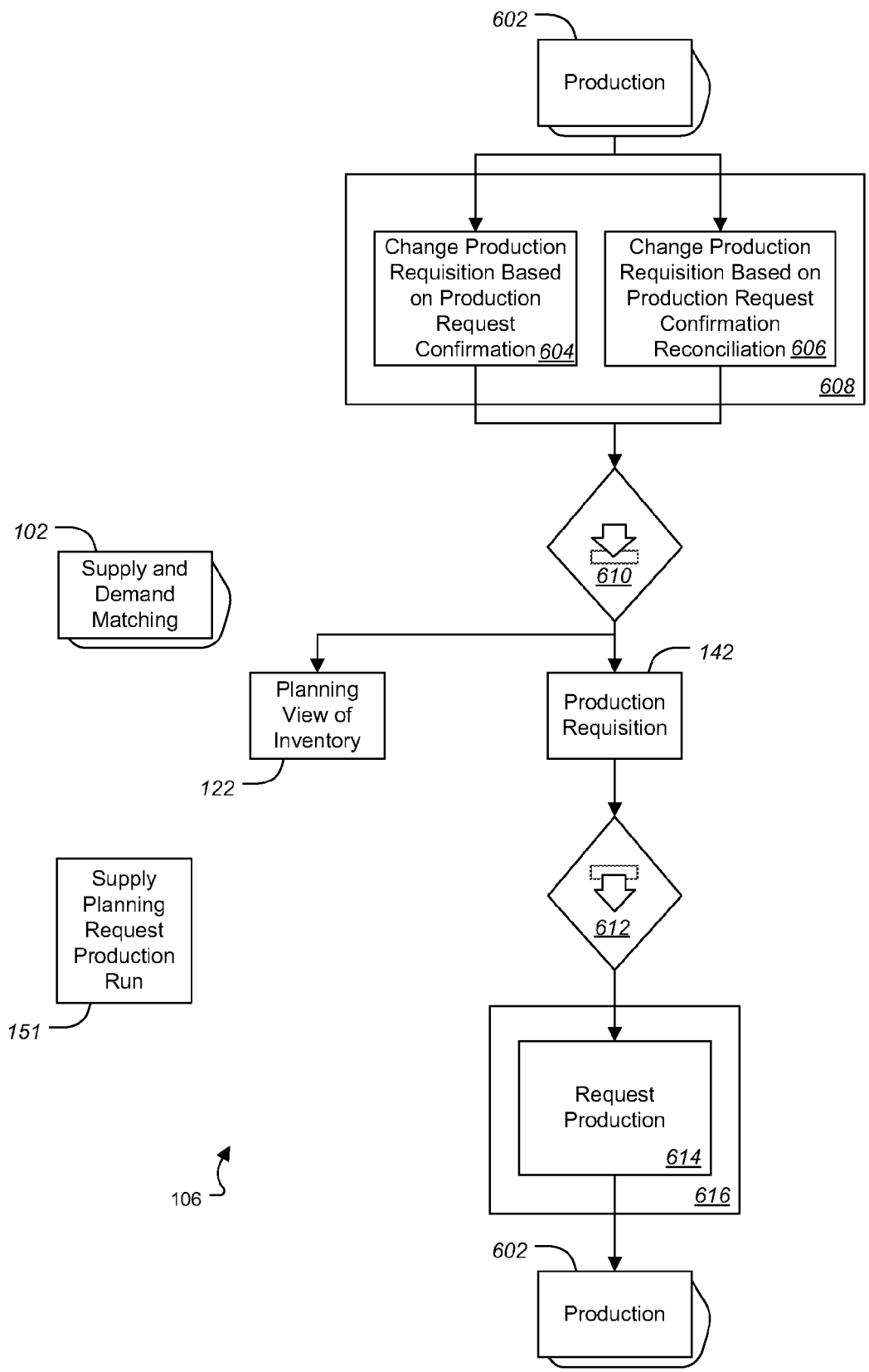
FIG. 6 is a block diagram showing a Production Trigger and Response process component.

FIG. 6 is a block diagram showing the Production Trigger and Response process component 106. The Production Trigger and Response process component 106 is an interface between planning and production. It handles production requisitions, receives information about the production progress, and updates the planning data accordingly.

For convenience in describing this process component, process components which are not part of the process component being described are shown in the figure. These other process components include a Production process component 602 and the Supply and Demand Matching process component 102. These other process components are used to represent software external to the process component in describing its interactions with the external software; however, while the external software can be implemented as such process components, this is not required.

The Production process component 602 is related to the execution of production on a shop floor, for example. It includes preparation, execution, confirmation, and completion as well as more general functions, e.g., scheduling and monitoring.

The Supply and Demand Matching process component 102 manages all of the tasks necessary to ensure that sufficient material receipt elements exist to cover material demand while taking available capacity into account.

As shown in FIG. 6, the Production Trigger and Response process component 106 includes the Production Requisition business object 142 and the Planning View of Inventory business object 122. The Production Requisition business object 142 is a requisition to production execution to produce a certain quantity of a specific material by a requested due date. The Planning View of Inventory business object 122 is a view of a material stock aggregated at the level of the supply planning area.

The Production Trigger and Response process component 106 also includes business objects that may not have external interfaces. These business objects include the Supply Planning Request Production Run business object 151. The Supply Planning Request Production Run business object 151 is a specification of an automated run that creates production requisitions for materials based on selected production planning orders.

The Production Trigger and Response process component 106 includes a Change Production Requisition Based on Production Request Confirmation operation 604 and a Change Production Requisition Based on Production Request Confirmation Reconciliation operation 606 in a Producing In interface 608. The Change Production Requisition Based on Production Request Confirmation operation 604 can receive confirmation of the maintenance of a production request and its execution from the Production process component 602.

The Change Production Requisition Based on Production Request Confirmation Reconciliation operation 606 can receive reconciliation of a production request confirmation from the Production process component 602. The operations 604 and 606 then trigger a Maintain Production Requisition Based on Production asynchronous inbound process agent 610. The Maintain Production Requisition Based on Production asynchronous inbound process agent 610 then updates the Planning View of Inventory business object 122, and can also update the Production Requisition business object 142.

An update or a creation of the Production Requisition business object 142 may trigger a Request Production from Production Requisition to Production asynchronous outbound process agent 612 to invoke a Request Production operation 614 in a Producing Out interface 616. The Request Production operation 614 then sends a request to the Production process component 602 to produce a certain quantity of a specific material by a requested due date.

Figure 7:
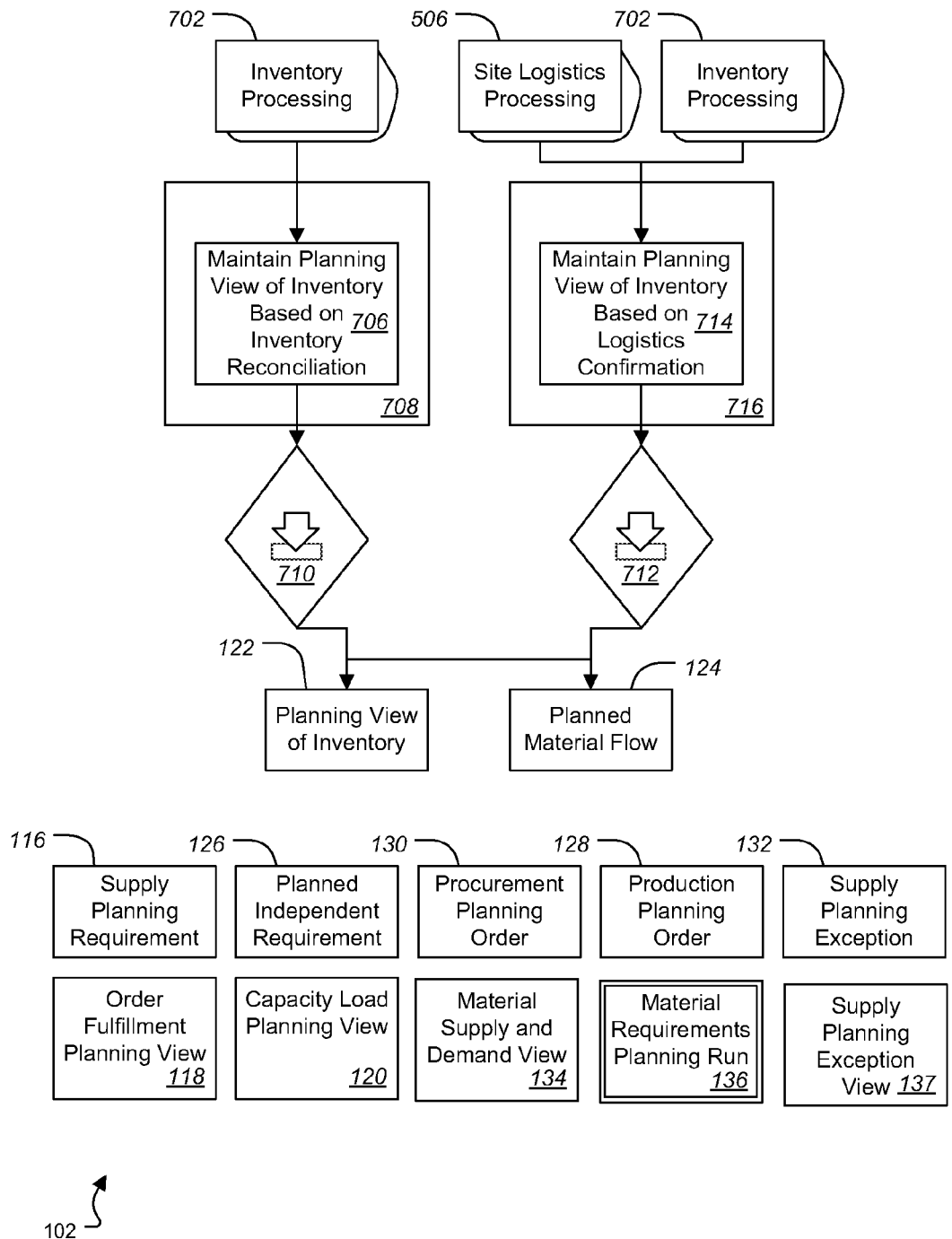
FIG. 7 is a block diagram showing a Supply and Demand Matching process component.

FIG. 7 is a block diagram showing the Supply and Demand Matching process component 102. The Supply and Demand Matching process component 102 manages all of the tasks necessary to ensure that sufficient material receipt elements exist to cover material demand while taking available capacity into account.

For convenience in describing this process component, a number of other process components are shown in the figure; these other process components are not part of the process component being described. These other process components are used to represent software external to the process component in describing its interactions with the external software; however, while the external software can be implemented as such process components, this is not required.

These other process components include an Inventory Processing process component 702 and the Site Logistics Processing process component 506. The Inventory Processing process component 702 manages inventory and recording of inventory changes. It provides services to maintain current stock, content and structure of logistic units and allocations. The Site Logistics Processing process component 506 is involved with the preparation, physical execution, and confirmation of logistics processes within a site. Logistics processes, which are based on site logistics process models, include picking, packing, shipping, and receiving, as well as value-added services.

As shown in FIG. 7, the Supply and Demand Matching process component 102 includes the Planning View of Inventory business object 122 and the Planned Material Flow business object 124. The Planning View of Inventory business object 122 is a view of a material stock, aggregated at the level of the supply planning area. The Planned Material Flow business object 124 is a material flow from a planned receipt to a planned requirement for a predetermined quantity. The Supply and Demand Matching process component 102 also includes business objects that may not have external interfaces. These business objects include: the Supply Planning Requirement business object 116, the Planned Independent Requirement business object 126, the Procurement Planning Order business object 130, the Production Planning Order business object 128, the Supply Planning Exception business object 132, the Order Fulfillment Planning View business object 118, the Capacity Load Planning View business object 120, the Material Supply and Demand View business object 134, the Material Requirements Planning Run master data run object 136, and the Supply Planning Exception View business object 137.

The Supply Planning Requirement business object 116 is a requirement that is derived from a business document, such as a sales order, an internal requirement, or a scheduling agreement, and to which details on the anticipated availability date have been added. It contains the material quantities required on specific dates, as well as information on which quantities are available on which dates.

The Order Fulfillment Planning View business object 118 is a single-level or multi-level planning view of receipts that are needed to fulfill a material requirement or of requirements that use a material receipt.

The Capacity Load Planning View business object 120 is a planning view of the capacity load of a resource in an evaluation period.

The Planned Independent Requirement business object 126 is an independent requirement derived from the forecast, and planned for a material for a particular time period in a particular supply planning area. The Production Planning Order business object 128 is a request made to a planning area (e.g., supply planning area) to initiate the production of a particular quantity of a material on a defined date.

The Procurement Planning Order business object 130 is a planned order for procuring materials that is to be placed with an external vendor. It defines required quantities and availability dates.

The Supply Planning Exception business object 132 is an exception that reports an incorrect planning situation, or an unsolved problem or error in supply planning.

The Supply Planning Exception View business object 137 is a view that provides both aggregated and detailed information for supply planning exceptions.

The Material Supply and Demand View business object 134 is an overview of the supply and demand situation for a particular material in a supply planning area. It provides supply planning functions and a projection of the development of the stock.

The Material Requirements Planning Run master data run object 136 is a specification of an automated run that plans material requirements based on selected material supply and demand views.

A Maintain Planning View of Inventory based on Inventory Reconciliation operation 706 in an Inventory Reconciliation In interface 708 receives a planning view of inventory reconciliation notification from one or more external components. The Maintain Planning View of Inventory based on Inventory Reconciliation operation 706 carries out an absolute quantity update of a stock item disaggregated actual inventory quantity information that is mapped for a material and certain usability in a supply planning area, in a certain inventory managed location, and for a certain identified stock in the process component supply and demand matching.

The Inventory Processing process component 702 may notify the Maintain Planning View of Inventory Based on Inventory Reconciliation operation 706 to update the Planning view of Inventory business object 122 using a Maintain Planning View of Inventory Based on Inventory Reconciliation asynchronous inbound process agent 710.

A Maintain Planning View of Inventory Based on Logistics Confirmation operation 714 in an Inventory Changing In interface 716 can receive a logistics confirmation inventory change notification from one or more external components. The Maintain Planning View of Inventory based on Logistics Confirmation operation 714 carries out a relative quantity change to an inventory item disaggregated actual inventory quantity information that is mapped for a material and certain usability in a supply planning area, in a certain inventory managed location, and for certain identified stock in the process component supply and demand matching.

The Inventory Processing process component 702 or the Site Logistics Processing processes component 704 may notify the Maintain Planning View of Inventory Based on Logistics Confirmation operation 714 to update the Planned Material Flow business object 124 using a Maintain Planning View of Inventory Based on Logistics Confirmation asynchronous inbound process agent 712.

Figure 8:
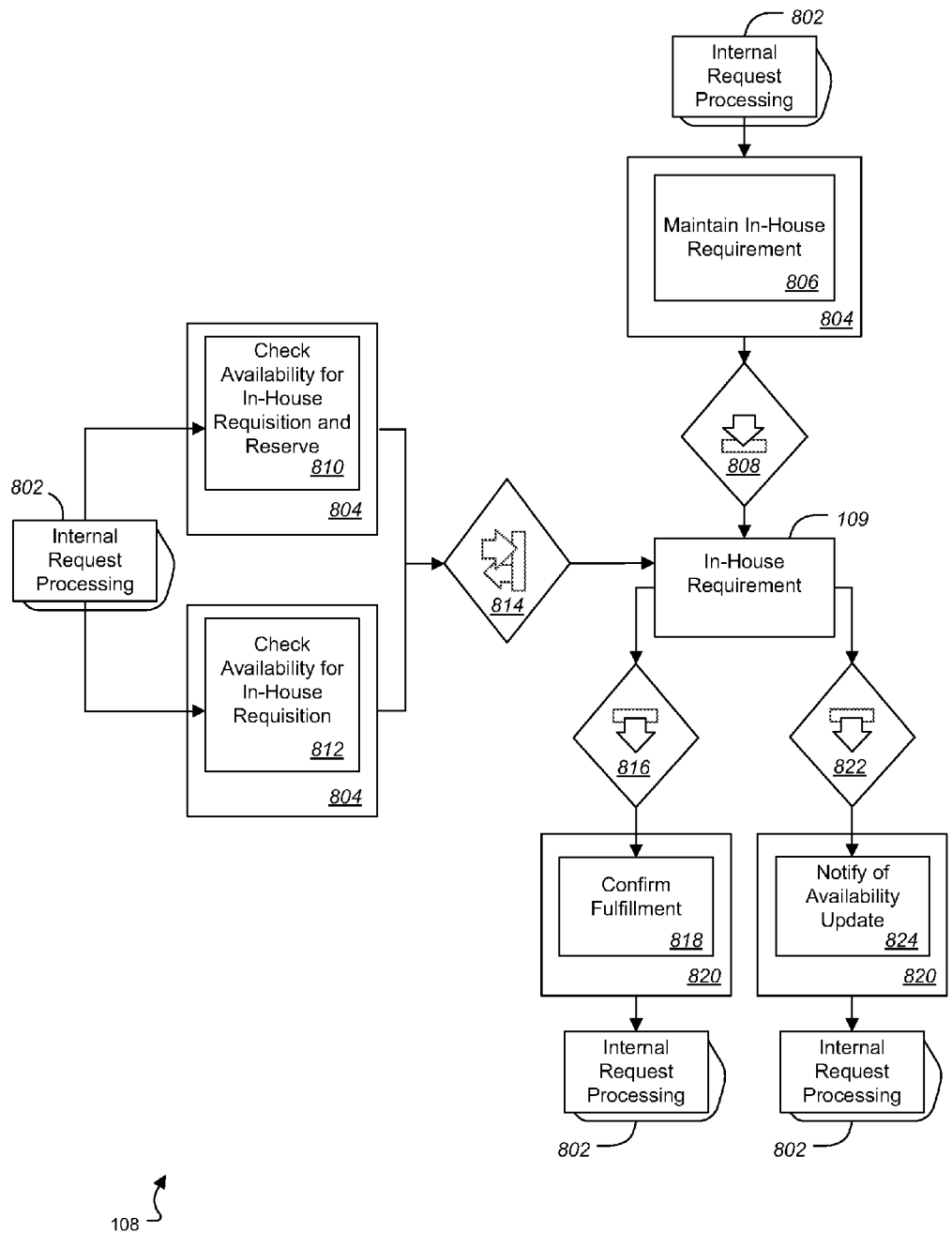
FIG. 8 is a block diagram showing an In-House Requirements Processing process component.

FIG. 8 is a block diagram showing the In-House Requirement Processing process component 108 (FIG. 1A). The In-House Requirement Processing process component 108 processes in-house requirements. Using an interface to self-service procurement, the In-House Requirement Processing process component 108 receives, prepares, and passes the in-house requirements to supply planning and logistics.

For convenience in describing this process component, other process components are shown in the figure; these other process components are not part of the process component being described. These other process components are used to represent software external to the process component in describing its interactions with the external software; however, while the external software can be implemented as such process components, this is not required. The other process component in this example includes an Internal Request Processing process component 802. The Internal Request Processing process component 802 manages and processes internal requests from employees.

As shown in FIG. 8, the In-House Requirement Processing process component 108 includes an Internal Fulfillment In interface 804 that includes a Maintain In-House Requirement operation 806. The Maintain In-House Requirement operation 806 uses a Maintain In-House Requirement asynchronous inbound process agent 808 to update the In-House Requirement business object 109.

The Internal Fulfillment In interface 804 also includes a Check Availability for In-House Requisition and Reserve operation 810 and a Check Availability for In-House Requisition operation 812.

Either the Check Availability for In-House Requisition and Reserve operation 810 or the Check Availability for In-House Requisition operation 812 triggers a Synchronous Check Availability synchronous inbound process agent 814 to update the In-House Requirement business object 109. The In-House Requirement business object 109 represents a requirement that expresses an internal customer demand from within the company. The Synchronous Check Availability synchronous inbound process agent 814 receives a request for a reserving or non-reserving available-to-promise check and triggers the corresponding customer requirement service.

An update or a creation of the In-House Requirement business object 109 triggers a Confirm Fulfillment from In-House Requirement to Internal Request Processing asynchronous outbound process agent 816 to invoke a Confirm Fulfillment operation 818 in an Internal Fulfillment Out interface 820. The Confirm Fulfillment from In-House Requirement to Internal Request Processing asynchronous outbound process agent 816 sends the fulfillment confirmation to the process component that requested the fulfillment.

An update or a creation of the In-House Requirement business object 109 can trigger a Notify of Available-to-Promise Update from In-House Requirement to Internal Request asynchronous outbound process agent 822 to invoke a Notify of Availability Update operation 824 in the Internal Fulfillment Out interface 820. The Notify of Availability Update operation 824 notifies about updated availability for requested materials.

Figure 9:
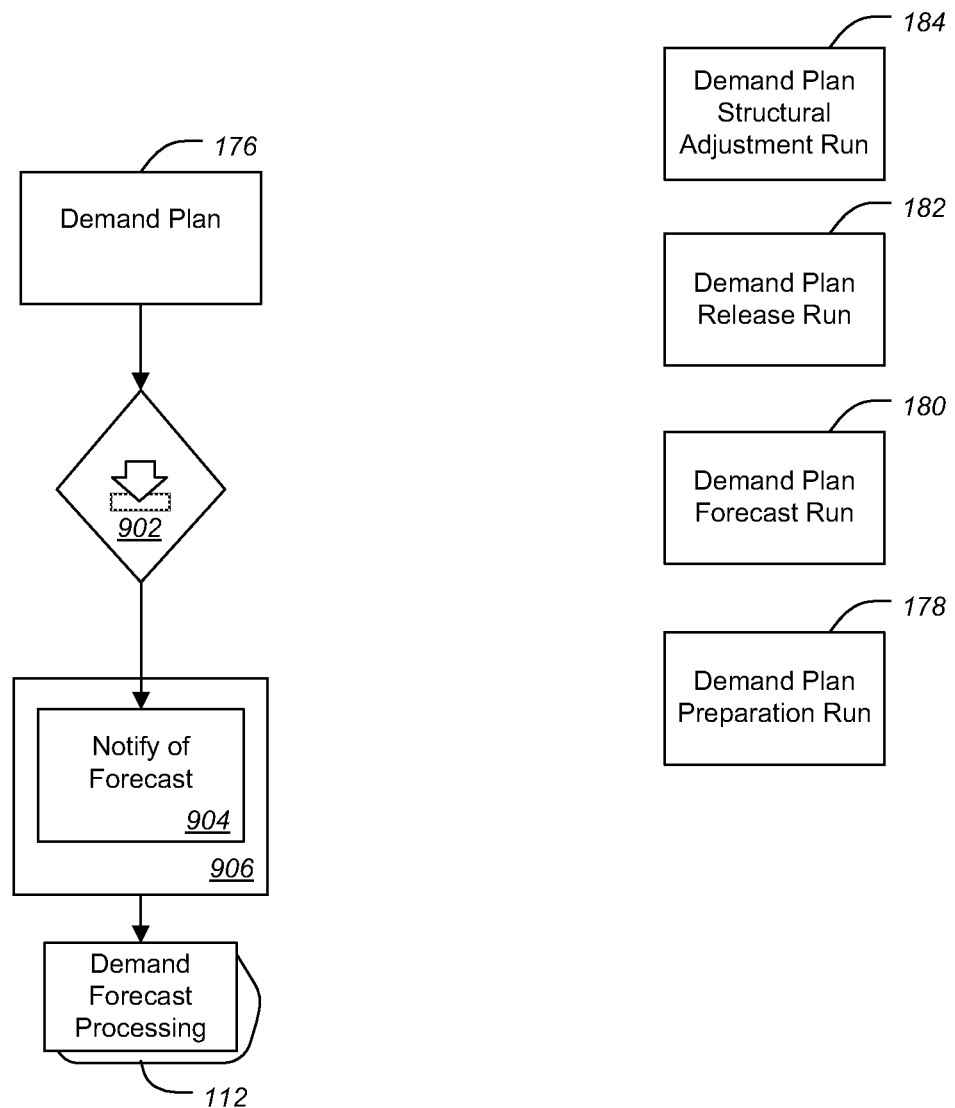
FIG. 9 is a block diagram showing a Demand Planning process component.

FIG. 9 is a block diagram showing the Demand Planning process component 172 (FIG. 1B). The Demand Planning process component 172 provides accurate and measurable estimates of future demand.

For convenience in describing this process component, a number of other process components are shown in the figure; these other process components are not part of the process component being described. These other process components are used to represent software external to the process component in describing its interactions with the external software; however, while the external software can be implemented as such process components, this is not required. The other process components in this example include the Demand Forecast Processing process component 112. The Demand Forecast Processing process component 112 receives, processes and subsequently releases demand forecasts to planned independent requirements.

The Demand Planning processing component includes the Demand Plan business object 176. The Demand Plan business object 176 represents a collection of quantitative forecasts of the product demands within a planning period. These forecasts are generated as required (e.g., at product, brand, or customer group level). An update or a creation of the Demand Plan business object 176 can trigger a Notify of Forecast from Demand Planning to Demand Forecast Processing asynchronous outbound process agent 902 to invoke a Notify of Forecast operation 904 in a Demand Forecasting Out interface 906. The Notify of Forecast operation 904 sends the current and deleted forecasts to the Demand Forecast Processing process component 112.

The Demand Planning process component 172 also includes business objects that may not have external interfaces, including the Demand Plan Preparation Run mass data run object 178, the Demand Plan Forecast Run mass data run object 180, the Demand Plan Release Run mass data run object 182, and the Demand Plan Structural Adjustment Run mass data run object 184.

The Demand Plan Preparation Run mass data run object 178 is a specification for an automated run that prepares a set of demand plans for forecasting. The Demand Plan Forecast Run mass data run object 180 is a specification for an automated run that performs forecasting and planning of material demands in certain supply planning areas, based on a set of demand plans. The Demand Plan Release Run mass data run object 182 is a specification for an automated run that releases forecasted quantities of material in a certain supply planning area, for a specified horizon, to supply chain planning, based on a set of demand plans. The Demand Plan Structural Adjustment Run mass data run object 184 is a specification for an automated run that adjusts the time series for selected demand plans in business intelligence, according to structural changes that may have been made to them.

The subject matter described in this specification and all of the functional operations described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a Web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as an exemplification of preferred embodiments of the invention. Certain features that are described in this specification in the context of separate embodiments, may also be provided in combination in a single embodiment. Conversely, various features that are described in the context of a single embodiment may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A non-transitory computer readable medium including program code executed by a processor for providing message-based services using a service-oriented methodology for implementing an instance of a supply chain control deployment unit, the medium comprising:

program code for storing an instance of the supply chain control deployment unit for the management and planning of on-time demand fulfillment, where the supply chain control deployment unit defines the limits of an application-defined transaction for the management and planning of on-time demand fulfillment by a set of actions that have atomicity, consistency, isolation, and durability in a database, and wherein the actions associated with the application-defined transaction are performed by one or more process components contained in the supply chain control deployment unit, wherein each process component comprises a software package realizing a business process and exposing the process component's functionality as one or more service operations, wherein the supply chain control deployment unit comprises:

a customer requirement processing process component, wherein the customer requirement processing process component implements the following service operations:
a check availability operation, a delete provisional customer requirement operation, a maintain customer requirement operation, a confirm fulfillment operation, a check availability and reserve operation, and a notify of availability update operation;

a demand forecast processing process component, wherein the demand forecast processing process component implements the following service operations: a maintain demand forecast operation;

an external procurement trigger and response process component, wherein the external procurement trigger and response process component implements the following service operations:
a maintain planning view of purchase order operation, a notify of purchase order delivery values operation, a change purchase requisition based on purchase request operation, and a request purchasing operation;

an in-house requirement processing process component, wherein the in-house requirement processing process component implements the following service operations:
a check availability for in-house requirement and reserve operation, a notify of availability update operation, a confirm fulfillment operation, a maintain in-house requirement operation, and a check availability for in-house requirement operation;

a logistics execution control process component, wherein the logistics execution control process component implements the following service operations:
a change logistics execution requisition based on delivery fulfillment confirmation operation, a maintain site logistics requisition operation, a change based on site logistics request confirmation reconciliation operation, a change site logistics requisition based on site logistics request confirmation operation, a maintain based on site logistics request notification reconciliation operation, a request site logistics, and a request delivery fulfillment operation;

a production trigger and response process component, wherein the production trigger and response process component implements the following service operations:
a change production requisition based on production request confirmation operation, a request production operation, and a change production requisition on production request confirmation reconciliation operation;

a supply and demand matching process component, wherein the supply and demand matching process component implements the following service operations:
a maintain planning view of inventory based on logistics confirmation operation and a maintain planning view of inventory based on inventory reconciliation operation;

wherein the process components of the supply chain control deployment unit are packaged together to be deployed on a single computer system, the single computer system comprising a single physical hardware platform;

program code for executing the application-defined transaction for the management and planning of on-time demand fulfillment; and program code for presenting data associated with the executed application-defined transaction for the management and planning of on-time demand fulfillment to a graphical user interface.

2. The medium of claim 1, wherein the customer requirement processing process component comprises a customer requirement business object and an available to promise check run business object.

3. The medium of claim 1, wherein the demand forecast processing process component comprises a demand forecast business object.

4. The medium of claim 1, wherein the external procurement trigger and response process component comprises a purchase requisition business object, a supply planning request procurement run business object, and a planning view of purchase order business object.

5. The medium of claim 1, wherein the in-house requirement processing process component comprises an in-house requirement business object.

6. The medium of claim 1, wherein the logistics execution control process component comprises a request logistics execution run business object, a logistics execution requisition business object, and a site logistics requisition business object.

7. The medium of claim 1, wherein the production trigger and response process component comprises a production requisition business object and a supply planning request production run business object.

8. The medium of claim 1, wherein the supply and demand matching process component comprises a production planning order business object, a material requirements planning run business object, a planning view of inventory business object, a supply planning exception business object, a supply planning exception view business object, a capacity load planning view business object, a material supply and demand view business object, a planned independent requirement business object, a planned material flow business object, a supply planning requirement business object, a procurement planning order business object, and an order fulfillment planning view business object.

9. The medium of claim 1, wherein the service operations associated with the customer requirement processing process component are grouped into service interfaces, the service interfaces comprising:
a fulfillment in interface that includes the check availability operation, the delete provisional customer requirement operation, the maintain customer requirement operation, and the check availability and reserve operation; and a fulfillment out interface that includes the confirm fulfillment operation and the notify of availability update operation.

10. The medium of claim 1, wherein the service operations associated with the demand forecast processing process component are grouped into service interfaces, the service interfaces comprising:

a demand forecasting in interface that includes the maintain demand forecast operation.

11. The medium of claim 1, wherein the service operations associated with the external procurement trigger and response process component are grouped into service interfaces, the service interfaces comprising:

an external procurement trigger and response fulfillment out interface that includes the notify of purchase order delivery values operation;

an ordering notification in interface that includes the maintain planning view of purchase order operation;

a purchasing in interface that includes the change purchase requisition based on purchase request operation; and a purchasing out interface that includes the request purchasing operation.

12. The medium of claim 1, wherein the service operations associated with the in-house requirement processing process component are grouped into service interfaces, the service interfaces comprising:

an internal fulfillment in interface that includes a check availability for in-house requirement and reserve operation, a maintain in-house requirement operation, and a check availability for in-house requirement operation;

an internal fulfillment out interface that includes a notify of availability update operation and a confirm fulfillment operation.

13. The medium of claim 1, wherein the service operations associated with the logistics execution control process component are grouped into service interfaces, the service interfaces comprising:

a fulfillment in interface that includes the change logistics execution requisition based on delivery fulfillment confirmation operation;

a fulfillment out interface that includes the request delivery fulfillment operation;

a site logistics notification in interface that includes the maintain site logistics requisition, the maintain based on site logistics request notification reconciliation operation, the change based on site logistics request confirmation reconciliation operation, and the change site logistics requisition based on site logistics request confirmation operation; and a site logistics processing out interface that includes the request site logistics operation.

14. The medium of claim 1, wherein the service operations associated with the production trigger and response process component are grouped into service interfaces, the service interfaces comprising:

a producing in interface that includes the change production requisition based on production request confirmation operation and the change production requisition on production request confirmation reconciliation operation; and a producing out interface that includes the request production operation.

15. The medium of claim 1, wherein the service operations associated with the supply and demand matching process component are grouped into service interfaces, the service interfaces comprising:

an inventory changing in interface that includes the maintain planning view of inventory based on logistics confirmation operation; and an inventory reconciliation in interface that includes the maintain planning view of inventory based on inventory reconciliation operation.

* * * * *